July 15, 1941.  J. I. BELLAMY ET AL  2,248,937
TRANSMITTING AND RECEIVING SYSTEM
Filed July 15, 1929    17 Sheets-Sheet 5

Inventors
John I. Bellamy,
Martin L. Nelson,
Herbert F. Obergfell

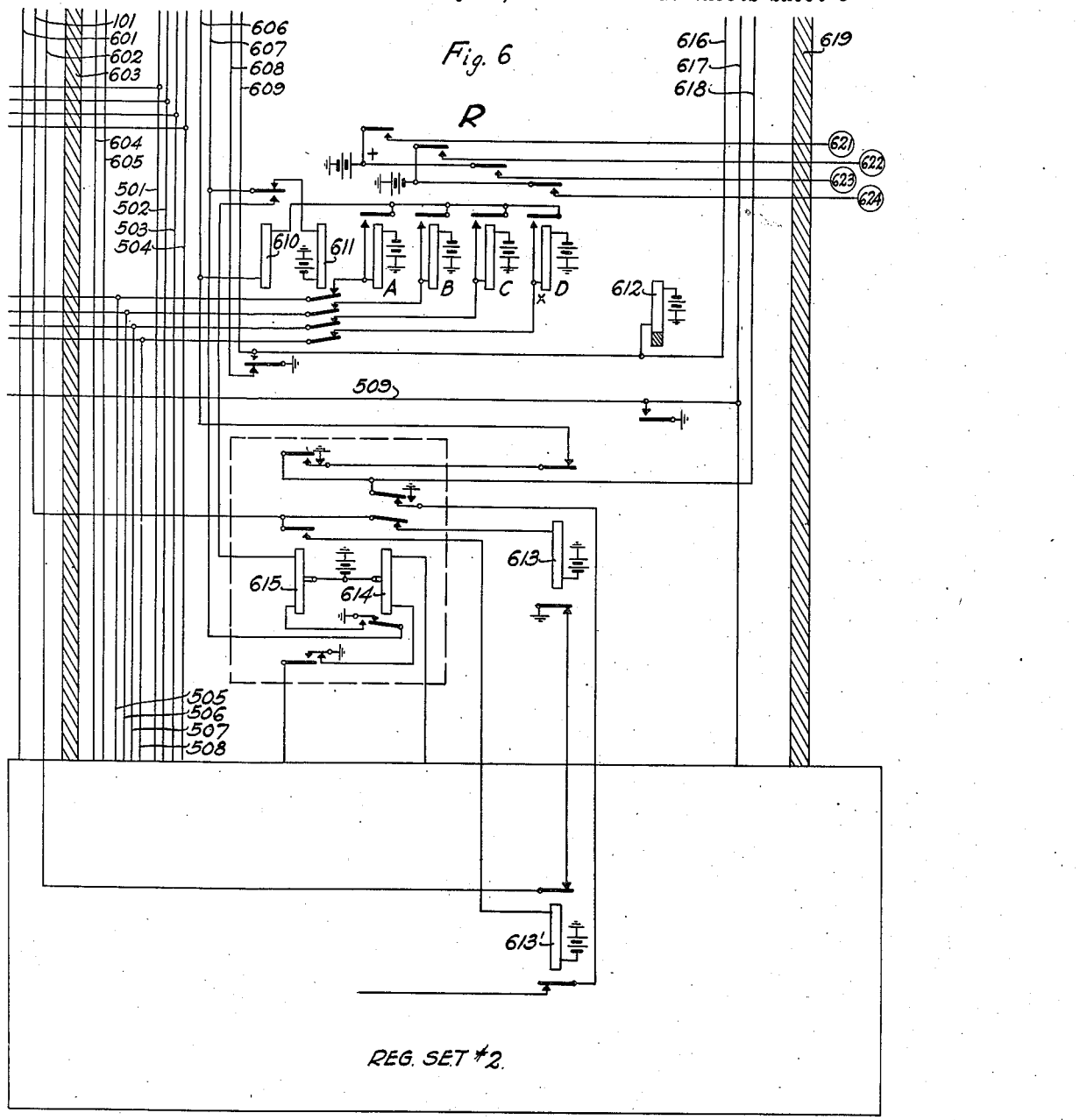

July 15, 1941.    J. I. BELLAMY ET AL    2,248,937
TRANSMITTING AND RECEIVING SYSTEM
Filed July 15, 1929    17 Sheets-Sheet 13
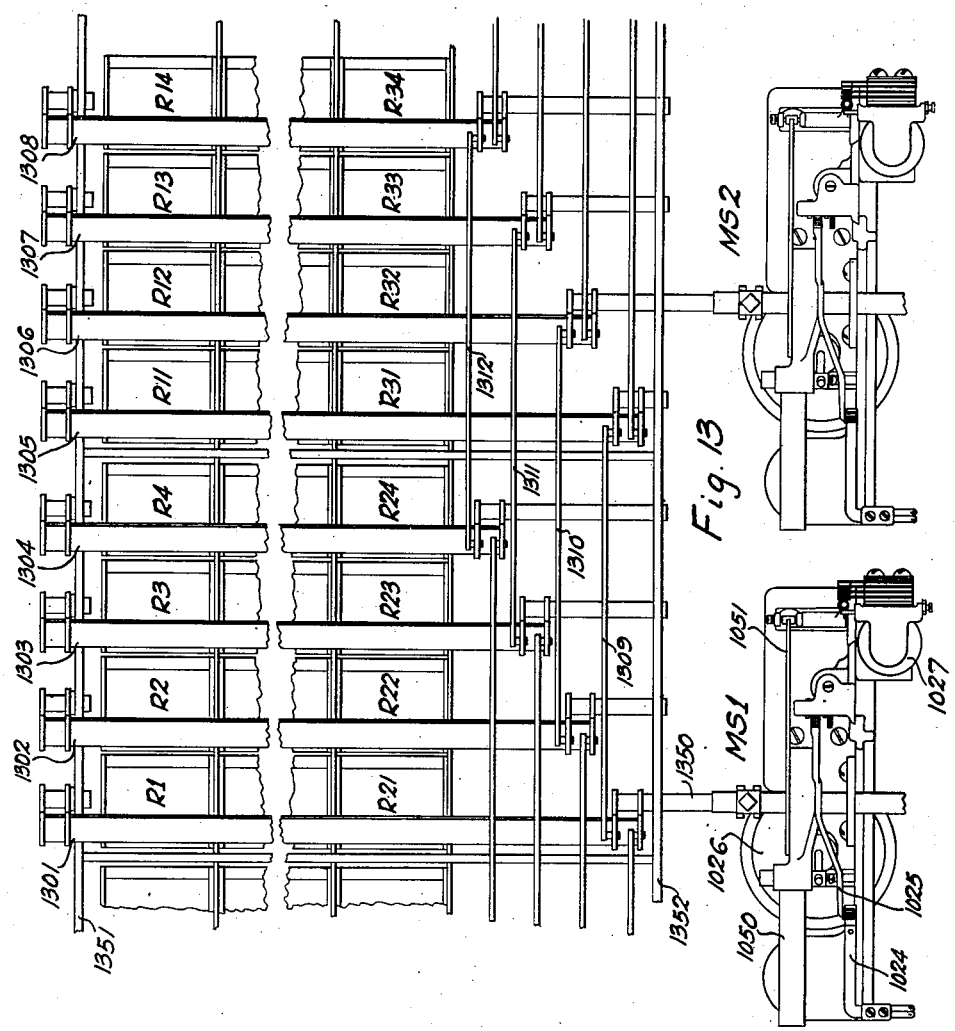
Inventors
John I. Bellamy,
Martin L. Nelson,
Herbert F. Obergfell
R S Richardson Atty.

July 15, 1941.   J. I. BELLAMY ET AL   2,248,937
TRANSMITTING AND RECEIVING SYSTEM
Filed July 15, 1929   17 Sheets-Sheet 14
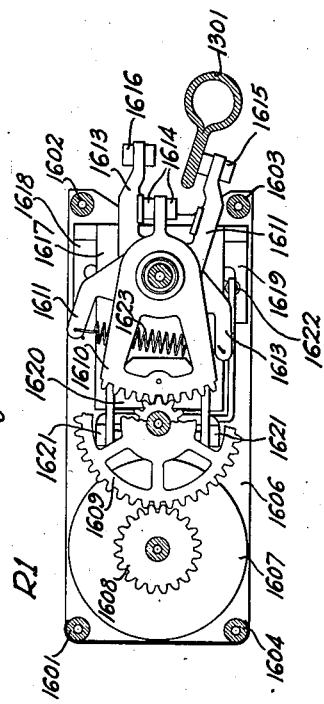
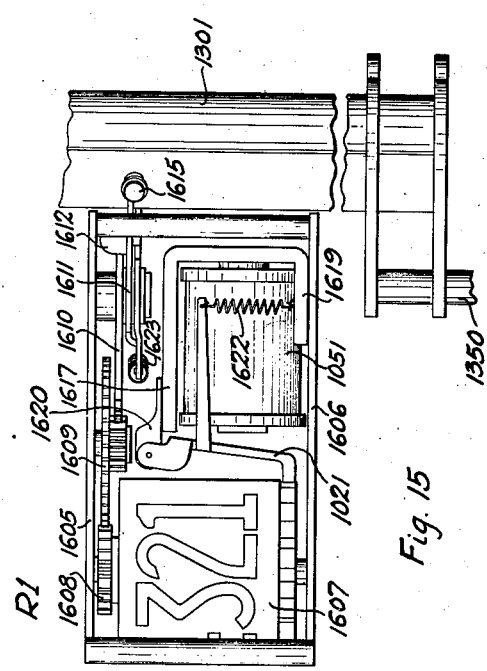
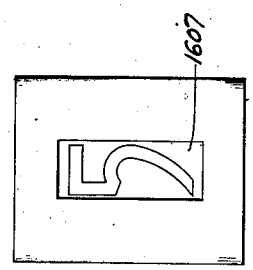
*Inventors*
John I. Bellamy,
Martin L. Nelson,
Herbert F. Obergfell
*Atty.*

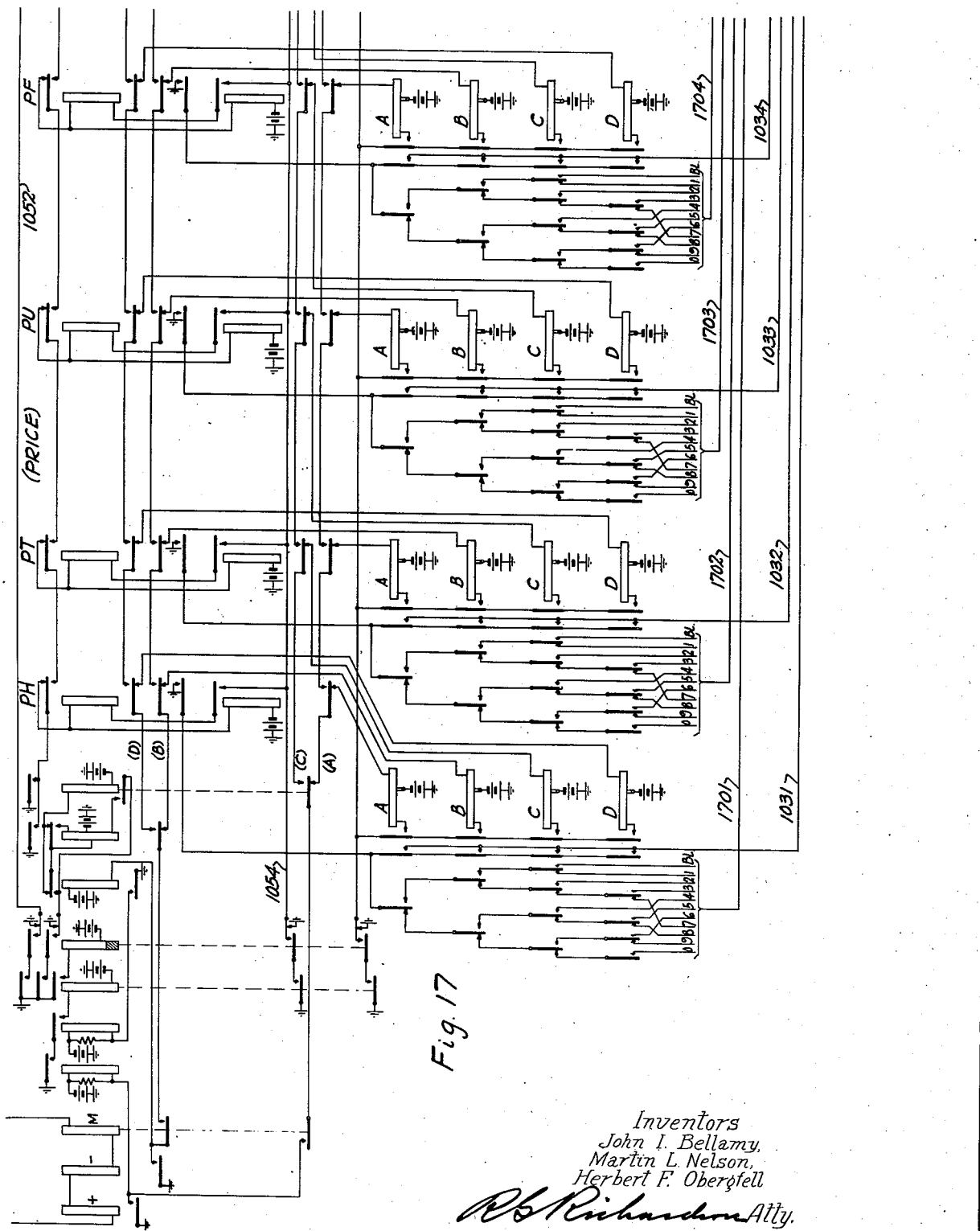

July 15, 1941.  J. I. BELLAMY ET AL  2,248,937
TRANSMITTING AND RECEIVING SYSTEM
Filed July 15, 1929   17 Sheets-Sheet 17
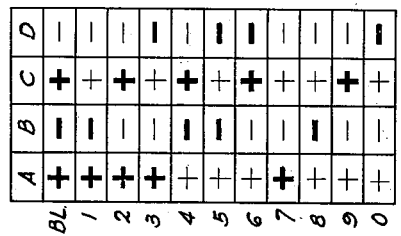
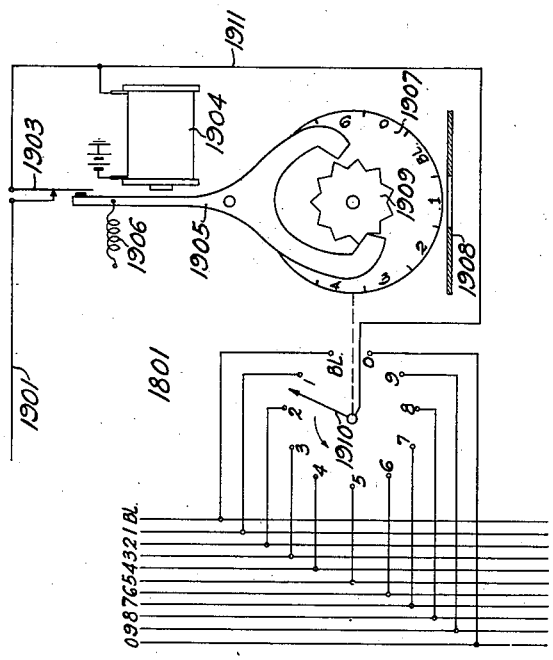
Inventors
John I. Bellamy
Martin L. Nelson
Herbert F. Obergfell
Atty.

Patented July 15, 1941

2,248,937

UNITED STATES PATENT OFFICE 2,248,937

TRANSMITTING AND RECEIVING SYSTEM

John I. Bellamy, Brookfield; Martin L. Nelson, Park Ridge, and Herbert F. Obergfell, River Forest, Ill., assignors, by mesne assignments, to Associated Electric Laboratories, Inc., Chicago, Ill., a corporation of Delaware Application July 15, 1929, Serial No. 378,208

6 Claims. (Cl. 177—353)

The present system relates to transmitting and receiving systems, but is concerned more particularly with systems of this kind wherein the transmitter comprises a register sender and wherein the receiver comprises an indicating device responsive to impulses received from the transmitter.

The main object, broadly stated, is the production of a new and improved transmitting and receiving system suitable for transmitting information regarding the selling price of stocks so that such prices may be received and set up on indicators at a plurality of points.

The object of the invention will perhaps be better understood if a brief description is given of the way in which stock brokers inform their customers at present of the price trend of the stocks they offer for sale. It is customary for a broker to have a so-called stock ticker in his office from which a tape slowly unwinds, giving the selling prices of the active stocks. The broker has an attendant who reads the tape and marks down the prices on a blackboard so that the waiting customers may see the trend of the market. In addition to showing the last selling price in a space provided under the name of a given stock, the blackboard shows yesterday's closing price, today's opening price, the high price of the day, and the low price of the day.

General description

One outstanding disadvantage of the method of procedure above outlined is that the person writing down the prices and making continuous changes is as often as not in such a position as to obscure the board from the view of the customers. In addition, the total amount of labor required, considering the brokers' offices as a whole, is quite enormous, and it is to the interest of efficiency to reduce this labor to a minimum. For this purpose, it is proposed to provide a single point at which the desired information can be recorded and to provide an automatically operated indicator in each broker's office controlled from a separate transmitter at the single recording point.

It is proposed further to make use of the usual ticker tape at the central point, and to provide two operators for setting up the quotations. The stocks are listed by means of the letters of the alphabet, some stocks being represented by a single letter, some by two, and others by three. In order to make a division of stocks between the two operators, all stocks represented by the letters A to K may be assigned to one operator, as well as all stocks of two or three letters of which the first letter is A to K. The second operator takes care of the sales involving the stocks L to Z and the plural letter stocks whose designations begin with any one of the letters L to Z. It will be understood, of course, that this line of division is purely arbitrary, and that any other division may be made from time to time as it becomes necessary.

The other objects and features of the invention, having to do with the manifold operations involved in setting up and transferring and displaying the type indications, are more or less subordinate to the objects and features hereinbefore enumerated, and will be understood best upon a further perusal of the specification in connection with the accompanying drawings.

Certain features of the present invention are being claimed in divisional applications, Serial Nos. 484,958 and 497,642, filed September 29, 1930, and November 24, 1930, respectively, now respectively Patents 2,192,217, dated March 5, 1940, and 2,096,954, dated October 26, 1937.

Description of drawings

Referring now to the drawings comprising Figs. 1–21, they show by means of the usual circuit diagrams and mechanical drawings a transmitting and receiving system embodying the features of the invention. More in particular, Figs. 1–8 show a transmitter which may be designated as a transmitter T1; Figs. 13–16 indicate mechanical details of the indicating apparatus in the receiver; Figs. 17 and 18 are circuit drawings to be substituted for Figs. 10 and 12 when a modified type of indicator is used at the receiving station; Fig. 19 is a combination mechanical and circuit drawing of a modified type of indicator with which the circuit drawings 17 and 18 are used in substitution for the circuit drawings 10 and 12; Fig. 20 is a table showing the code according to which the impulses are transmitted by the transmitter and are received and recorded in the receiver.

The transmitter

Figure 2:
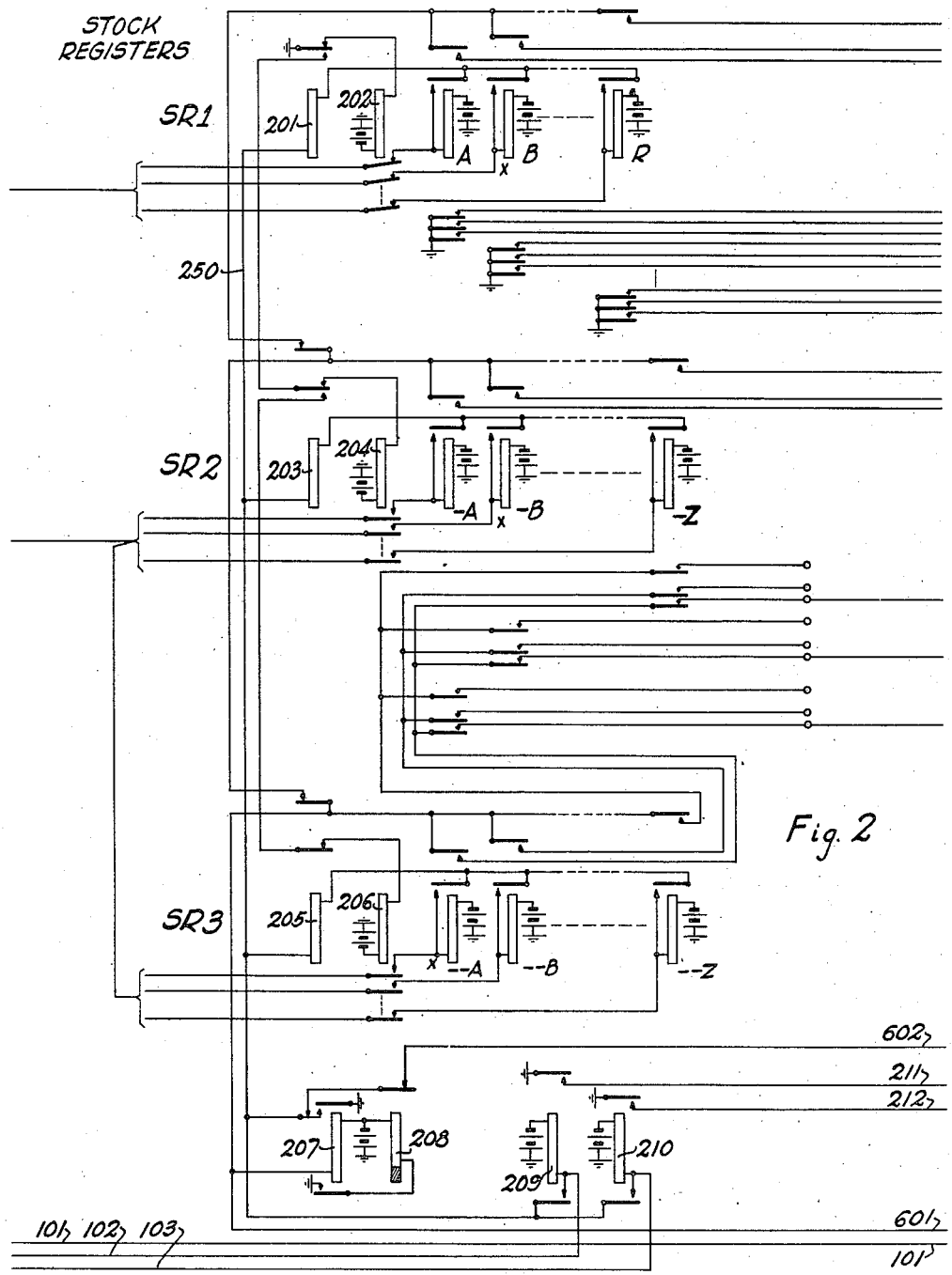
Figure 3:
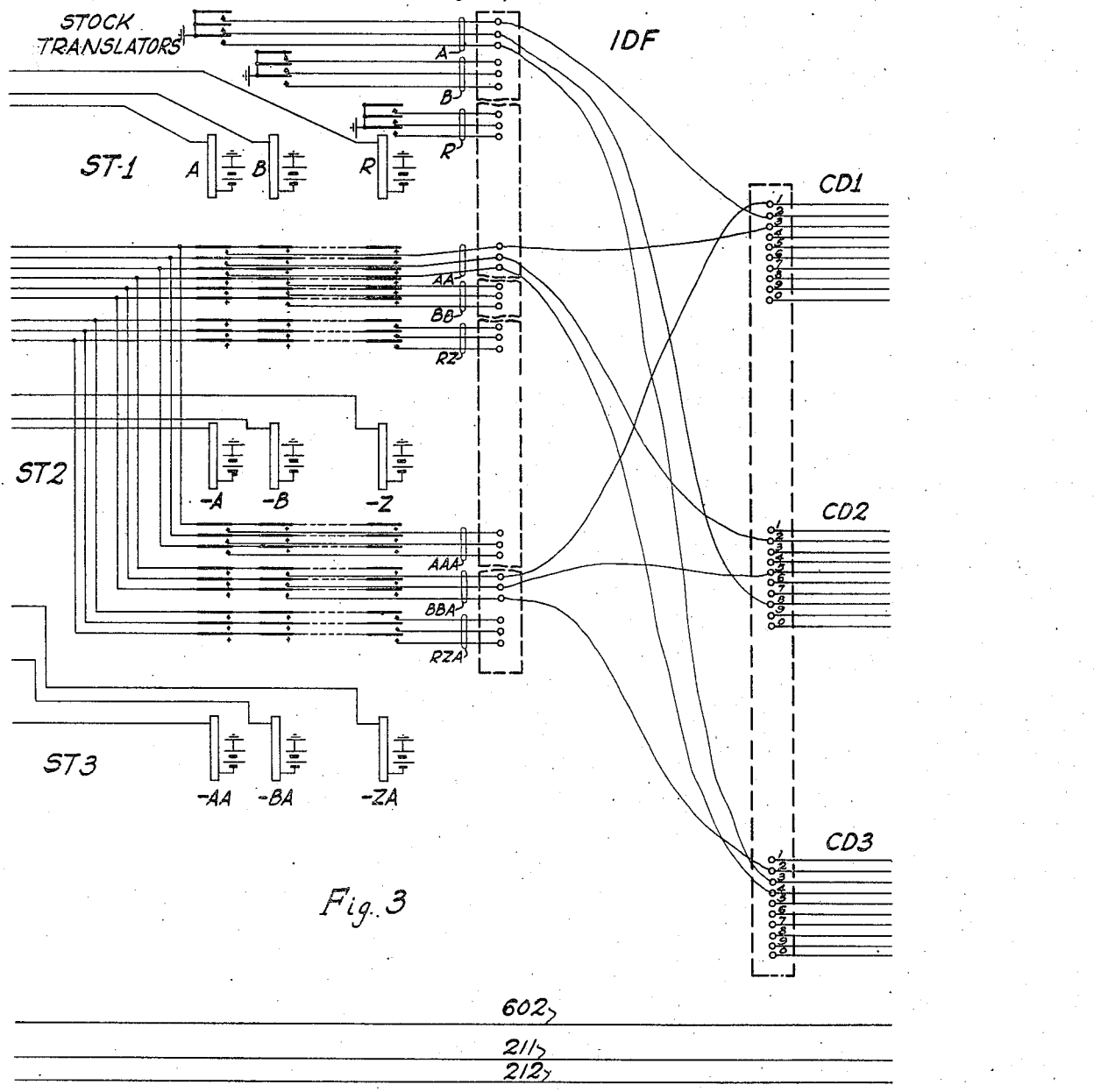

The apparatus for registering the stock-designating letters comprises the stock registers SR1 and SR2 and SR3 of Fig. 2, and the apparatus for translating the registration of stock letters into a three-digit code to be sent to the receiving stations comprises the stock translators ST1, ST2, and ST3, as well as the intermediate distributing frame IDF, Fig. 3. The price registers for registering the price (at which a current stock transaction took place) under the control of the digit keys of Fig. 5 comprises the price registers shown in Fig. 7. The price register PH registers the price hundreds digit; the register PT registers the price tens digit; the register PU registers the price units; and the register PF registers the price fractions digit. These designations hold true in case a full price quotation is sent, but the arrangement varies somewhat in case a lesser number of price digits is sent as will be hereinafter explained.

Figure 4:
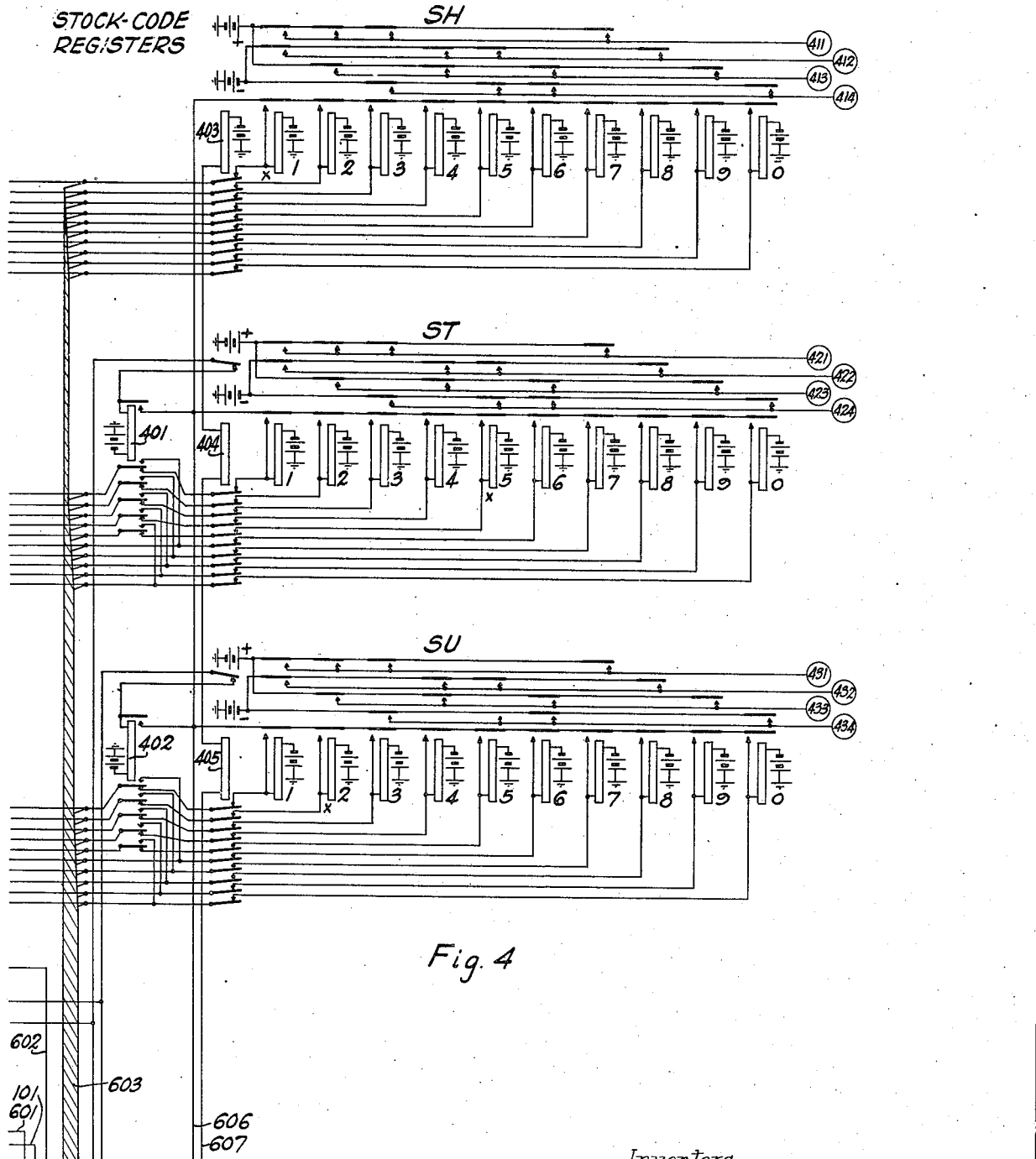

The stock code registers shown in Fig. 4, which are set from the translating apparatus of Fig. 3, through the intermediate distributing frame IDF, comprise the stock hundreds register SH, the stock tens register ST, and the stock units register SU. It may be further pointed out that a so-called range indication (to be later explained) is registered on the range register R of Fig. 6 under control of the range keys of Fig. 5.

Figure 5:
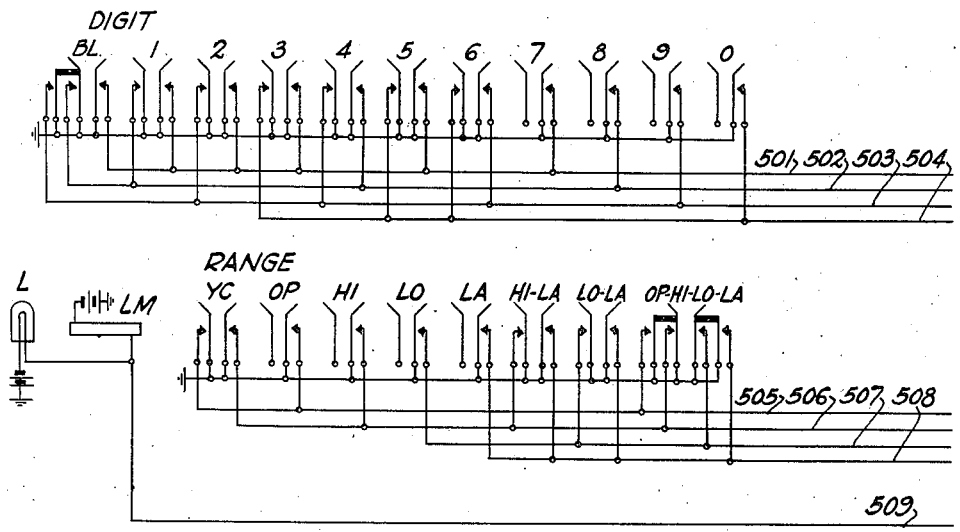
Figure 21:
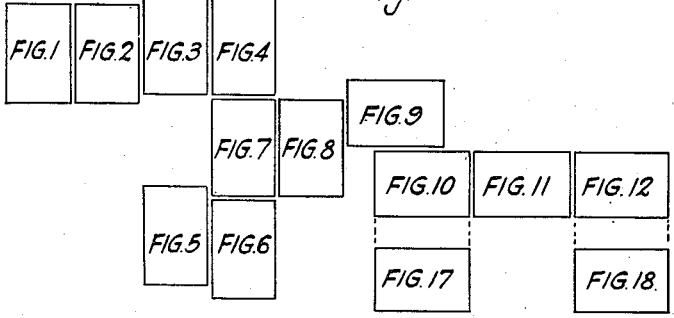
Fig. 21, appearing on the lower part of the same sheet with Fig. 5, is a layout of the drawings Figs. 1 to 12 and Figs. 17 and 18.

It will be noted that the lower portion of Fig. 6 includes a rectangle labelled "Register set #2." This register set #2 contains a duplicate of the equipment shown in Figs. 4 and 5 and of the range register R of Fig. 6. The two register sets are arranged to be used alternately so that a second registration may be set up immediately following the first and while the first is held stored on the first register set and is being transmitted. The relays 614 and 615, it may be pointed out, are common to the two registers and are arranged to switch from one register to another automatically at the end of a registration so as to automatically switch the next register into service.

Figure 7:
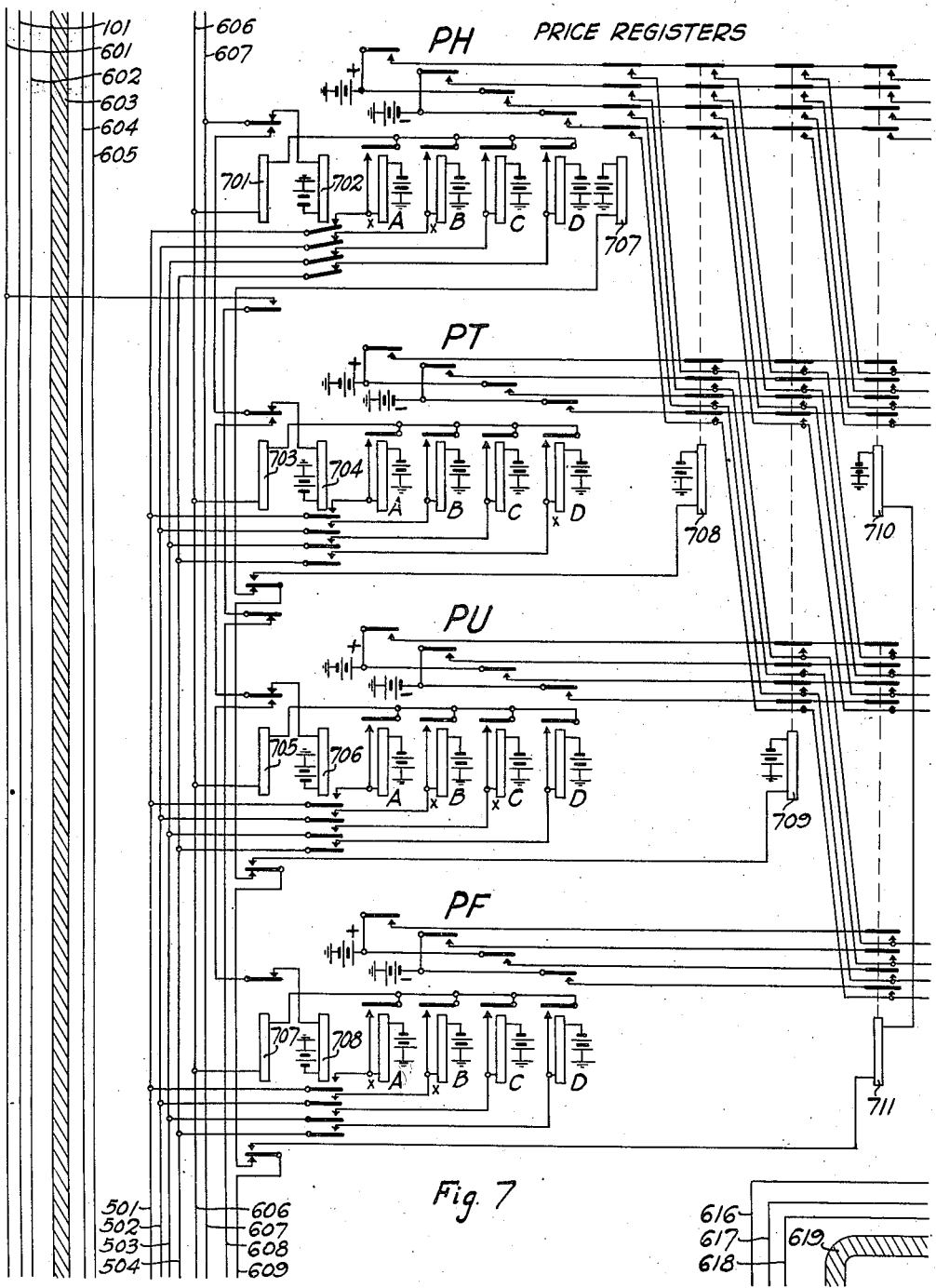
Figure 8:
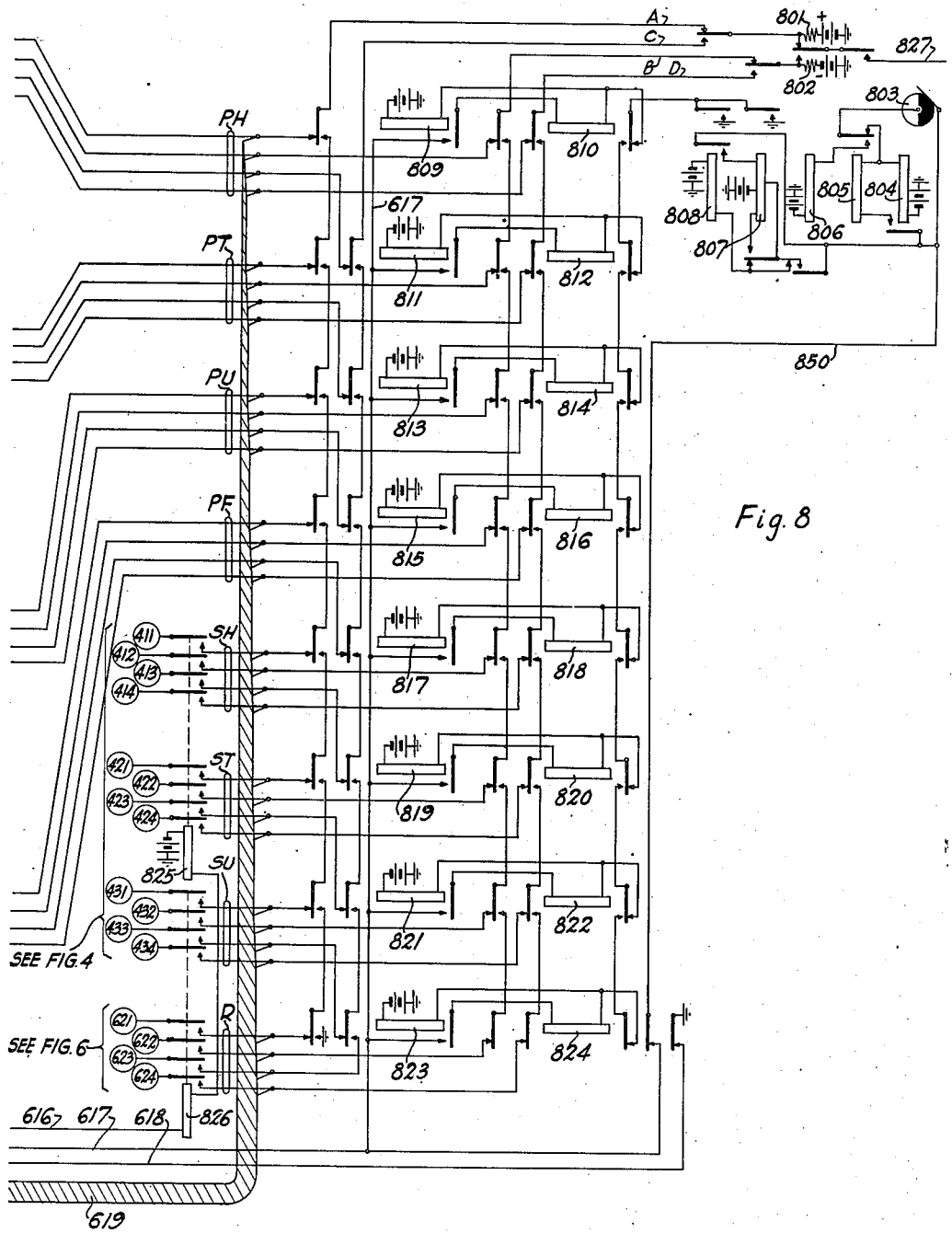

The apparatus shown in Fig. 8 is the sending apparatus and it sends digit impulses under the control of the two register sets shown in Figs. 4, 6, and 7. The impulses transmitted by the sender of Fig. 8 go out over the conductor 827 to the repeater R1, Fig. 9, and are from thence repeated to the several receiving stations.

*Detailed description*

The system having been described generally, a detailed description of the operation of apparatus shown will now be given. For this purpose, a description of the operations involved when the operator at the transmitter T1, shown in Figs. 1 to 8, sets up a quotation on her key set of which the letter keys are shown in Fig. 1 and the digits keys and range keys in Fig. 5.

It will be assumed that the register set No. 1 comprising the registering apparatus of Figs. 4 and 7 and the upper portion of Fig. 6 is in service at the time the operator sets up the quotation to be now described, this being true because the relay 614 is energized as shown and because the relay 615 is deenergized as shown. It will be assumed further that the letters representing the stock whose quotation is to be transmitted are the letters B, B, and A and that the price to be transmitted is 104⅛ dollars. It will be assumed further that this is neither the high price nor the low price of the day and that it is accordingly set up as merely the last price. The full indication to be set up may be represented by BBA—1041—LA. The first portion is set up by operating the stock letter keys of Fig. 1. The second portion is set up by operating the digit keys of Fig. 5; and the final portion (the range indication) is set up by operating a range key of Fig. 5.

*Stock registration*

Figure 1:
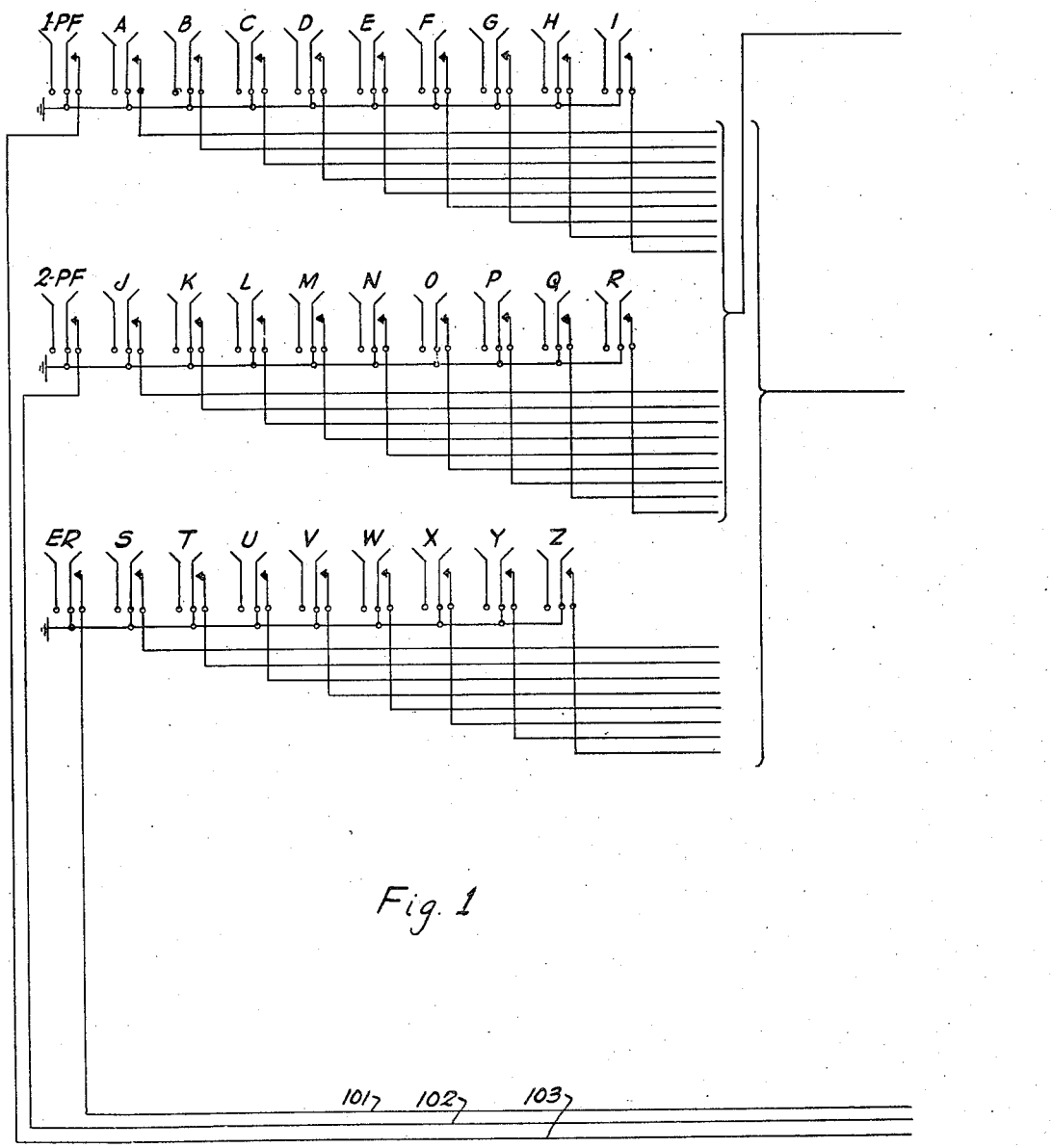

To set up this "number" the operator first operates the letter key B of Fig. 1. These keys, it will be understood, are non-locking keys of the push-button type, being arranged so that, when the operator depresses a key to close the contacts thereof and releases the key, the plunger returns to normal and the contacts of the key open. When the key B is pushed, a circuit is closed from ground through the contacts of the key and through contacts of the normally-energized connecting relay 202 for the register relay B of the stock register SR1. Relay B energizes and at its inner upper armature closes a locking circuit for itself through the transfer relay 201 from the grounded conductor 250, which is grounded through contacts of relays 207 and 208 from the grounded conductor 602, which latter conductor is grounded in Fig. 6 through contacts of the error relays 613' of the register set #2 and 613 of the register set #1. The locking circuit for relay B does not become effective immediately and relay 201 remains short circuited and deenergized as long as the key B of Fig. 1 is held depressed, but, when the key B is released, the short circuit is removed from around relay 201 and it energizes in series with relay B and opens the circuit of relay 202 and closes a circuit for connecting relay 204 through the inner armature of relay 203. Relay 204 pulls up and relay 202 falls back and disconnects the conductors of the keys A to R from the storage relays A to R of the stock register SR1. It will be noted, of course, that only the relays A, B, and R of this set are shown and that only the corresponding contacts of relay 202 are shown. It will be understood that the intervening relays are connected up in the same manner as those shown. A similar curtailment occurs in the case of the registers SR2 and SR3 and in each case it has been for the purpose of simplifying the drawings.

When the operator depresses the letter key B to register the second stock letter B, a circuit is closed through contacts of relay 204 of the stock register SR2 for the B relay in this stock register. It will be noted that this relay is designated —B. This indicates that the registration of this relay is the second letter of a stock, and that the first letter may be any one of several. When the relay —B operates, it closes at its inner upper armature a locking circuit for itself to the said grounded conductor 250 by way of the transfer relay 203. Relay 203 is accordingly operated when the key B of Fig. 1 is allowed to restore and it transfers the operating ground from relay 204 to relay 206 by way of contacts of the transfer relay 205. Accordingly relay 204 falls back and disconnects the letter keys A to Z from the second-letter storage relays —A to —Z, and relay 206 energizes through contacts of relays 201, 203, and 205, and connects the letter keys A to Z to the third-letter relays ——A to ——Z of the stock register SR3. The relays of the register SR3 are designated in this manner to indicate that they are the third letter relays and that the first two letters are variable letters, that is either one of the first two letters may be any one of a plurality.

When the operator depresses the key A of Fig. 1 a circuit is closed through contacts of relay 206 for the relay ——A which operates and at its inner upper armature closes a locking circuit for itself through relay 205 to the grounded conductor 250. Accordingly, transfer relay 205 operates in series with relay ——A when the A key is released and at its inner armature it disconnects relay 206 and allows it to fall back and disconnect the letter keys from the associated relays ——A to ——Z.

The stock concerning which the quotation is about to be transmitted has now been identified on the registering apparatus by the above-described energization of relay B of the stock register SR1, of relay —B of the stock register SR2, and of the letter ——A of the stock register SR3. This three-letter registration is to be subsequently translated by the translating apparatus of Fig. 3 into a pre-assigned three-digit code in a manner to be hereinafter pointed out.

*Price registration*

Referring now to Figs. 5, 6, and 7, when the operator depresses the digit key 1, Fig. 5, to register the price-hundreds digit 1, a circuit is closed from ground through the right and left contacts of the digit key 1 over conductors 501 and 502 for the storage relays A and B of the price hundreds register PH, Fig. 7, through contacts of connecting relay 702, which latter relay is energized through contacts of transfer relay 701 from the grounded conductor 607, conductor 607 being supplied with ground potential through the lower armature of the energized relay 614 of Fig. 6. When relays A and B operate, they close locking circuits for themselves at their inner armatures through transfer relay 701 to the grounded conductor 606, conductor 606 being grounded at this time through the upper contacts of relay 613 and the normally closed contacts controlled by the upper armature of relay 615. As a result, when the digit key 1 of Fig. 5 is allowed to restore, the locking circuit for relays A and B becomes effective and relay 701 energizes therein and transfers the grounded conductor 607 from relay 702 to the connecting relay 704 through contacts of the transfer relay 703. Accordingly, relay 702 falls back and disconnects the key conductors 501-504 from the relays A to D of the price hundreds register PH, and relay 704 operates and connects these conductors to the corresponding relays of the price tens register PT.

When the operator depresses the digit key 0 to set up the price-tens digit, a circuit is closed from ground over conductor 504 and through contacts of connecting relay 704 for relay D of the price tens register PT. Relay D operates and locks itself at its inner armature to the grounded conductor 606 by way of the transfer relay 703. Relay 703 accordingly energizes when the digit key 0 is restored and it transfers the operating conductor 607 from connecting relay 704 to the connecting relay 706 by way of contacts of the transfer relay 705. Relay 704 accordingly falls back and relay 706 operates, and conductors 501-504 are disconnected from the relays of the register PT and are connected to the relays A to D of the register PU.

When the operator depresses the digit key 4 to set up the price-units digit 4, a circuit is closed from ground through the contacts of the digit key 4 over conductors 502 and 503 for the relays B and C of the price units register PU. These relays operate and close locking circuits for themselves at their inner armatures through the transfer relay 705 to the grounded conductor 606. As a result, when the key 4 of Fig. 5 is released, relay 705 operates and transfers the operating ground from relay 706 of the price-units register to the relay 708 of the price-fractions register PF. Conductors 501-504 are accordingly disconnected from the relays of the price-units register by the deenergization of relay 706 and are connected to the relays A to D of the register PG by the energization of relay 708.

When the fractions digit 1 (indicating ⅛) is recorded by depressing the digit key 1, relays A and B of the price-fractions register PF operate over conductors 501 and 502 and close locking circuits for themselves to conductor 606 by way of transfer relay 707. As a result, relay 707 operates when the digit key 1 is released and it opens the circuit of relay 708, whereupon relay 708 falls back and disconnects the conductors 501-504 from the relays A to D of the price-fractions register PF.

*Range registration*

Having recorded the stock and the price quotation, the operator indicates the range by depressing the range key LA to cause the price quotation to be recorded as the last price. When this key is depressed, a circuit is closed from ground through the contacts of the key and over conductor 508 and through contacts of relay 611 for relay D of the range register, relay 611 being energized from the grounded conductor 607 through contacts of relay 610. Upon operating, relay D of the range register R closes a self-locking circuit at its inner contacts through relay 610 to the grounded conductor 606. As a result, relay 610 energizes when the range key LA is released and with results to be explained hereinafter.

The registration is now complete and the result of the registration will be taken up in detail.

*Stock transfer and translation*

Since a stock may be identified by one letter, by two letters, or by three letters, arrangements are provided for delaying the transfer of a registration to the translating apparatus of Fig. 3 until a price digit is recorded in order to avoid the premature transfer of a two-letter indication as a single-letter indication or the transfer of a three-letter indication as a two-letter indication. The way this transfer takes place will now be pointed out.

When the transfer relay 701 associated with the price-hundreds register PH energizes as hereinbefore pointed out upon the release of the digit key following its depression for the first price digit 1, it closes a circuit at its lower armature which starts at ground through the lower contacts of transfer relay 610 of the range register R, Fig. 6, and continues by way of conductor 608, lower contacts of relay 703, lower contacts of relay 701 (now energized), stock transfer conductor 601, to the upper armatures of relays ——A to ——Z of the register SR3, Fig. 2. This conductor is extended to the corresponding armatures of the relays —A to —Z of the stock register SR2 in case only a two-letter designation is recorded on account of the fact that relay 205 is not energized in such case, and it is extended through contacts of relay 203 to the corresponding armatures of relays A to R of the stock register SR1 in case only a one-letter designation is recorded, as in this case the transfer relay 203 is not operated. However, in the present case, a full three-letter designation is recorded and the further extension of the conductor 601 is prevented due to the operated condition of the upper armature of relay 205. With relay ——A energized as before explained, the circuit continues from conductor 601 through the upper contacts of the relay —A, contacts of the energized relay —B, to the relay —BA of the stock translator ST3. Relay —BA energizes.

The relay —BA, it will be noted, has a plurality of sets of contacts, three contact pairs a set. Each of these contact sets is associated with a different one of the groups of conductors, three conductors a group, grounded under the control of the relays A to R of the stock register SRI. Relay —BA closes all of these conductors through to the left-hand side of the intermediate distributing frame IDF, but only the set labeled BBA at the IDF is grounded on account of the fact that only the relay B of the stock register SRI is energized. On the right-hand side of the intermediate distributing frame IDF there are three sets of terminals, one terminal set is connected with a band of conductors labeled CD1, indicating that this band of conductors corresponds to the first code digit; the next set of contacts on the right-hand side of the IDF terminates the conductors labeled CD2, having to do with the second code digit; while the third set of contacts terminate the group of conductors CD3, having to do with the third code digit. The contacts of each of these sets are labeled 1 to 0 and they correspond respectively to the digits 1 to 0. The conductor groups CD1, CD2, and CD3 extend at this time through the contacts of the energized relays 403, 404, and 405 to the relays 1 to 0 of the stock code registers SH, ST, and SU, corresponding to the hundreds, tens, and units code digits by means of which the stocks are identified at the receiving station.

There is a separate code assigned to each stock and the three contacts corresponding to a stock in each case are cross-connected in accordance with the code. For example, the code assigned to the stock BBA, now under consideration, is the code number 152. Accordingly, the upper terminal of the set of three terminating the BBA conductors on the left hand side of the frame IDF is cross-connected to the first contact of the upper set on the right-hand side of the frame IDF; the second terminal is cross-connected to the fifth terminal of the second set on the right-hand side of the frame; while the third terminal of the set BBA on the left-hand side is cross-connected as shown to the second terminal of the third set on the right-hand side of the frame. As a result, a circuit is closed over the first of the group of conductors labeled CD1 for the first register relay of the stock-hundreds register SH; a circuit is closed over the fifth one of the conductors CD2 and through contacts of relays 401 and relay 404 for the fifth relay of the stock-tens register ST; and a circuit is closed through the second one of the conductors CD3, and through contacts of relays 402 and 405 for the second relay in the stock-units register SU. These relays operate and at their inner upper armatures close locking circuits for themselves to the register locking conductor 606.

A moment later, the transfer relay 703 associated with the price tens register PT, Fig. 6, energizes upon the setting up of the tens digit by the operator, and at its lower armature it opens the initial energizing circuit for the above-mentioned relay —BA of Fig. 3 by removing ground at its lower armature from the stock transfer conductor 601. Relay —BA falls back, but the operated relays of Fig. 4 remain operated over the locking conductor 606 as they are locked at their inner-upper armatures as above mentioned.

It may be pointed out at this time that in case only a single digit is set up on the price register it is, of course, set up on the register PH and the next digit to be set up is the range digit. In this case the operation of the transfer relay 610 of the range register R opens the above-mentioned circuit over conductor 601 at its lower armature so that in any case the circuit of the energized stock translating relay of Fig. 3 is closed for only the time elapsing between the registration of two digits. By this means, these relays, which carry heavy spring loads, can be provided with heavy windings with no danger of overheating.

*Transfer to register set #2*

When the transfer relay 610 of the range register R of Fig. 6 operates as hereinbefore pointed out, it places ground at its lower armature on conductor 616 and on conductor 609. As a result, relay 612 is operated to place ground on the locking conductor 509 and the sender-start conductor 617. As a result of the placing of ground potential on conductor 609, a circuit is closed through the lower armature of the operated transfer relay 707 of the price-fractions register PF for the relays 711 and 710 in series. These two relays energize and connect the control conductors of the registers PH, PT, PU, and PF to the corresponding conductors of the sending apparatus of Fig. 8.

As a further result of the operation of relay 610, it opens the circuit of relay 611 at its upper armature, as hereinbefore pointed out, and extends the ground potential to the upper winding of the relay 615. Relay 615 operates and at the normally closed contacts controlled by its lower armature opens the circuit of the lower winding of relay 614. When this occurs, relay 614 falls back and at the normally closed contacts controlled by its lower armature closes a holding circuit for relay 615 through its lower winding, and at about the same time opens the initial energizing circuit for the upper winding of relay 615, by removing the ground potential from conductor 607. When conductor 607 is thus ungrounded, relays 405, 404, and 403 of Fig. 4 fall back and disconnect the conductors CD1, CD2, and CD3 from the associated register relays of the registers SH, ST, and SU.

As a further result of the deenergization of relay 614 and the energization of relay 615, the error relay 613 of the register set #1 is disconnected and the corresponding relay 613' of register set #2 is connected up.

As a still further result of the deenergization of relay 614 and the energization of relay 615, conductor 618, which is grounded at the outer contacts of relay 824 of the sender, Fig. 8, is connected at the upper armature of relay 615 to locking conductor 606 through contacts of relay 613 in place of the local ground connection at the normally closed contacts controlled by the upper armature of relay 615. Accordingly, the locking conductor 606 is maintained grounded and the locked-up register relays of Figs. 4, 7 and 6 remain operated until such time as the ground potential is removed from conductor 618 by the sending apparatus, as will be hereinafter described.

Responsive to the grounding of conductor 509 by the lower armature of the slow-acting start relay 612, the locking magnet LM associated with the range keys in Fig. 5 energizes and by means of a mechanical interlocking arrangement (not shown) prevents any of the range keys from being depressed. This arrangement is employed to insure that the operator will not get two full numbers set up before the sender has finished sending out the first.

*Operation of the sender*

As a result of the grounding of conductor 617 by the start relay 612, a locking circuit is prepared for the relays 809–824 and a branch circuit extends through the middle-right contacts of relay 824 to the start conductor 850, preparing a locking circuit for relays 805, 807, and 808. When conductor 850 is grounded, a circuit is closed through the constantly operating interrupter 803, as soon as the interrupter closes, for relay 804. Relay 804 operates and closes a locking circuit for itself in series with 805. This locking circuit does not take effect as long as the interrupter 803 remains closed owing to the fact that relay 805 is short circuited, but, when the interrupter 803 opens, the short circuit is removed from around relay 805, relay 805 operates and disconnects the left-hand terminal of the interrupter from the junction of relays 804 and 805 and extends it to the sending relay 806. As a result, relay 806 responds to the interrupter 803 each time it closes following the operation of relay 805 and sends alternate, positive and negative impulses over the conductor 827 by way of the upper contacts of relay 805 and through the key 901 to the relays 902–904 of the repeater R1.

By referring to the table shown in Fig. 20, it will be noted that each digit 1 to 0, as well as the blank digit BL, is represented by four impulses, a positive, a negative, a second positive, and a second negative. The distinction between the digits is made in accordance with whether an impulse is light or heavy. The heavy impulses are represented by bolder characters than the light ones. For example, the blank digit is represented by a heavy positive, a heavy negative, a heavy second positive, and a light second negative; the digit 1 is represented by a heavy positive, a heavy negative, a light positive, and a light negative; etc. The sending apparatus in the upper right-hand corner of Fig. 8 is arranged to send out a succession of positive and negative pulses through the resistances 801 and 802 and these pulses are light unless made heavy by the connections made to the conductors A, B, C, and D, connected to the contacts of relays 807 and 808, by the registers of Figs. 4, 7, and 6.

The first positive pulse is sent when relay 805 pulls up upon the opening of the interrupter 803 following the operation of relay 804. This sends a light positive impulse over conductor 827 through the upper contacts of relay 805 and the upper armature and back contact of relay 806 by way of the resistance 801 unless there is a direct connection to battery over the upper contact of relay 808 and conductor A. When relay 806 operates, when the interrupter 803 again closes, a light negative impulse is sent through resistance 802 and the upper contacts of relays 806 and 805 unless this light impulse is changed to a heavy one by a connection made by one of the registers to conductor B. In this way the operations of relay 806 result in a train of positive and negative impulses being sent over conductor 827.

Keeping in mind that relays 710 and 711 are energized over conductor 609 as hereinbefore pointed out and that the relays 825 and 826 are energized over conductor 616 in parallel with start relay 612, it will be noted that conductor A of the sender is connected through the left-hand armature of relay 809 and through contacts of relay 710 to the contacts of relay A of the price-hundreds register PH, Fig. 7. Relay A, it will be recalled, is locked energized, as is relay B, with the result that the first positive impulse transmitted is a heavy impulse due to the direct connection of positive battery through the contacts of relay A and back through the contacts just mentioned to conductor A and thence to conductor 827 by way of the upper contacts of relays 806 and 805. Now, when relay 806 energizes to terminate the first positive impulse and transmit the first negative impulse, a heavy negative impulse is transmitted through the contacts of relay B of the price-hundreds register PH, Fig. 7, through contacts of relay 710, left-hand contacts of relay 810, conductor B, upper contacts of relay 807, and the upper armatures of relays 806 and 805.

As a further result of the first energization of relay 806, a circuit is closed at the lower armature thereof through the lower armature, normal, of relay 807 for relay 808. This happens at the termination of the first positive impulse and after the A conductor has been effective in influencing the first positive impulse and making it heavy as above pointed out. Consequently, the resting contact of the upper armature of relay 806 may now be shifted from the A conductor to the C conductor, and this is done at the upper armature of relay 808. As a result, when relay 806 falls back to send the second positive impulse, this impulse is transmitted as a light impulse through resistance 801 unless a positive potential is encountered over conductor C. This conductor C is now connected through the inner left-hand armature of relay 811 to the contacts of relay C of the price-hundreds register PH, but the impulse is not altered by this connection on account of the fact that the relay C of the price-hundreds register is not at this time energized. As a result, the second positive impulse in this digit is a light impulse, and this is in accordance with the table shown in Fig. 1 where impulses for the digit 1, now being transmitted, are indicated.

As a further result of the operation of relay 808 it closes a locking circuit for itself in series with relay 807, but this locking circuit is not effective at this time due to the fact that the initial circuit of relay 808 is still closed. When relay 806 falls back to send the second positive impulse, it opens the initial circuit of relay 808 whereupon relay 807 energizes in series with relay 808 from the grounded conductor 850 through the inner upper contacts of relay 808, upper winding of relay 807, contacts controlled by the lower armature of relay 806, and relay 808 to battery. Upon energizing, relay 807 connects its lower winding in multiple with the winding of relay 808.

When relay 806 operates to transmit the second negative impulse, the last impulse of the first digit, it closes at its lower armature a circuit for the lower winding of relay 807 through the lower armature, operated, of relay 807, and opens the circuit of relay 808. Relay 808 now falls back and leaves relay 807 operated until relay 806 falls back at the end of the negative impulse, whereupon relay 807 falls back, and the relays 807 and 808, having passed through a complete cycle during the two negative impulses of the first digit, are in their original condition ready to operate in the same way coincident with the two negative impulses of the second digit.

It will be recalled that relay 808, upon operating, shifts the resting contact of the upper armature of relay 806 from the A conductor to the C conductor, and that this operation occurs between the first and second positive impulses and while the first negative is being delivered. As a further result of the energization of relay 808, it closes a circuit at its middle upper armature and through the right-hand contacts of relay 810 for relay 809. Relay 809 operates and at its left-hand armature transfers the A conductor from the price-hundreds conductor group PH to the price-tens conductor group PT through contacts of relay 811. This transfer may be made conveniently at this time, as the A conductor has already been used and is now disconnected at the upper armature of relay 808. As a further result of its energization, relay 809 at its right-hand armature closes a locking circuit for itself through the grounded conductor 617 through relay 810. Relay 810, of course, does not energize as long as the initial circuit of relay 809 remains closed.

It will be noted that relay 807 closes a multiple point in the initial energizing circuit of relay 809 at its inner upper armature when it energizes following the termination of the impulse for energizing relay 808. Accordingly, relay 809 remains energized directly and relay 810 remains short circuited until relay 808 has fallen back and until relay 807 has fallen back at the end of the second negative impulse. It may be kept in mind that relay 807, upon energizing at the end of the first negative impulse and while the second positive impulse is being delivered, shifts the working contact of the upper armature of relay 806 from the B conductor to the D conductor preparatory to sending out the second negative impulse, and it will be seen that it is permissible following the sending of the second negative impulse to switch the B and D conductors out of engagement with the price-hundreds conductor set PH and into connection with the conductors of the price-tens set PT extending to the price-tens register PT of Fig. 7 by way of contacts of relay 710. This is done at the left-hand armatures of relay 810 when relay 810 energizes in series with relay 809 upon the falling back of relay 807 at the end of the second negative impulse.

The first digit consisting of four impulses alternating positive and negative, has been transmitted and the control conductors A, B, C, and D have been transferred from the price-hundreds group PH to the price-tens group PT. The result is that the next four impulses transmitted are under the control of the price tens register PT, Fig. 7. Since only the D relay of the price-tens register PT, Fig. 7, has been energized by the registration of the price-tens digit 0 (see Fig. 20), the first three impulses of the second series go out as light impulses and only the fourth impulses, the second negative, is changed to a heavy impulse. The relays 811 and 812 are operated by the relays 807 and 808 in the same manner as described in connection with relays 809 and 810. The result is that the conductors A, C, B, and D are transferred to the price-units register PU by the time the price-tens digit is transmitted.

In a similar manner that the units and fractions digits 4 and 1 are set up on the registers PU and PF, Fig. 7, are transmitted in accordance with the table shown in Fig. 7, relays 813 and 814 being energized by the end of the units transmission, and the relays 815 and 816 being energized by the end of the fractions transmission.

With the relays 815 and 816 energized at the end of the fractions transmission, the conductors A to D, connected to the upper contacts of relays 807 and 808, are now extended through the energized relays 809 and 816 and through the contacts of relays 817 and 818 to the stock-hundreds conductor group SH, which conductors are connected through contacts of relay 825 to conductors 411-414. The circles 411-414 indicate that the conductors to which these circles are attached connect to the similarly indicated conductors of the stock-code hundreds register SH, Fig. 4. The connecting conductors have been omitted in the drawings so as to avoid undue complication. In a similar manner, the conductors 421-424 of Fig. 8 connect to the corresponding conductors 421-424 of the register ST, Fig. 4, and the conductors 431-434 of Fig. 8 join to the corresponding conductors of the stock-units code register SU, Fig. 4. Accordingly, the digit 1 registered on the register SH by the placing of negative potential on conductor 412 by the eighth storage relay of the group is transmitted in the same manner as the preceding digits; the digit 5 registered on the stock-tens register ST is next transmitted through the contacts of the fifth register relay of the group by the potentials connected to conductors 422 and 423 in accordance with the table, Fig. 20, relays 817 and 818 having energized in the hereinbefore described manner by the end of the transmission of the stock-hundreds code digit. In the same way, relays 819 and 820 energized during the transmission of the stock-tens digit and transfer the control conductors to the stock-units register by way of contacts of relay 826 and conductors 431-434. As a consequence, the stock-units code digit 0 set up by the energization of the tenth register relay of the stock units register SU is transmitted in the hereinbefore described manner, and the relays 821 and 822, Fig. 8, are energized, transferring the control to the range set of conductors R and thence through contacts of relay 826 to the conductors 621-624. These conductors are connected to the corresponding conductors of the range register R, Fig. 6, and the last-price indication stored by the hereinbefore-described operation of the register relay D is transmitted in the same manner as any one of the preceding digits.

*Clearing out the transmitter*

When relay 824 energizes at the end of the range digit, it removes ground from conductor 850 extending to the relay 804-808, whereupon relay 806 ceases to follow the interrupter 803, and the relays 804 and 805 fall back. The conductor A is now grounded at the left-hand contacts of relay 823 so as to prevent a further positive impulse from being sent out following the range digit, which would occur otherwise before relay 805 has had time to fall back.

As a further result of the energization of relay 824 it removes ground at its right-hand armature from conductor 618, and consequently from the register locking conductor 606, which is now extended through to conductor 618 by way of contacts of relay 613 and contacts of the operated relay 615. As a result, the operated transfer relays 610, Figs. 6, 701, 703, 705, and 707 of Fig. 7, together with the operated register relays of Figs. 6 and 7 and the operated register relays of Fig. 4 fall back. When relay 610 falls back it removes ground from conductors 609 and 616, whereupon relays 710 and 711 of Fig. 7 and relays 825 and 826 of Fig. 8 fall back, the circuit of relays 710 and 711 being open also by relay 707.

The circuit of slow-acting start relay 612 is opened at the lower armature of relay 610 when ground is removed from conductors 609 and 616. This relay remains operated for a slight interval to insure at least a minimum spacing between successive operations of the sender. After an interval, relay 612 falls back and removes ground from conductors 509 and 617. Removing ground from conductor 617 allows the relays 809–824 to fall back, and removing ground from conductor 509 permits the locking magnet LM associated with the range keys to deenergize and it permits the operation of any one of the range keys. In case the operator is in the process of transmitting another quotation and has proceeded so far as to have her finger on one of the range keys, she is notified of the unlocked condition by her ability to depress the range key. The lamp L connected in multiple with the locking magnet LM gives a further indication by glowing while the magnet is energized and by becoming extinguished when the magnet deenergizes to unlock the keys.

When the operator depresses her keys for the next number, relays in the stock registers of Fig. 2 are operated, and a transfer of the stock indication to the stock translator and intermediate distributing frame IDF of Fig. 3 takes place as described. In this case, since relay 615 is energized and relay 614 deenergized, the stock code is transferred to register set No. 2 by way of the conductor in the cable 603 through relays therein corresponding to relays 403, 404, and 405 of Fig. 4, and the price and range indications are registered directly on the register set No. 2 due to the fact that the conductor in register set No. 2 corresponding to conductor 607 is now grounded through the lower armature of relay 615.

When the range register in register set No. 2 is operated by the depression of the range key, a circuit is closed for the upper winding of relay 614 through contacts of the relay corresponding to relay 610, and relay 614 becomes energized again and relay 615 falls back.

It will be noted that the several branches of the conductors A, B, C, and D of Fig. 8 are multipled by means of cable 619 to the register set No. 2 so as to enable the sending apparatus of Fig. 8 to operate from the register set No. 2. Following the operation of the range register in register set No. 2, the start relay in register set No. 2 corresponding to start relay 612, Fig. 6, is operated, and a starting ground potential is placed on conductor 617 to start the sending apparatus of Fig. 8 to operate again, and a branch circuit extends over conductor 509 to lock the range keys to prevent the operation of any one of them until the sender of Fig. 8 has finished transmitting what is set up on the register set No. 2.

Figure 9:
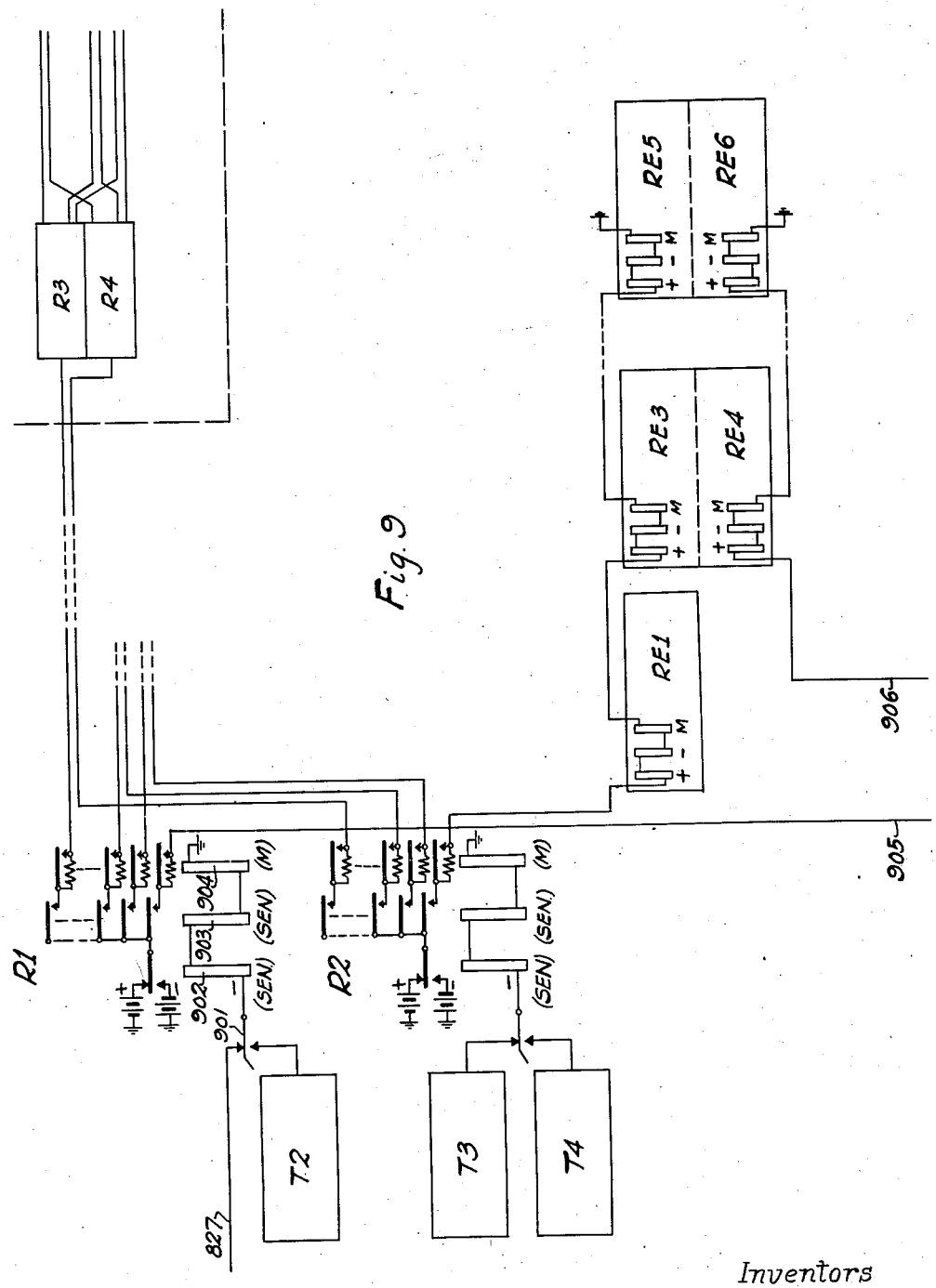
Fig. 9 indicates the transmitters T2, T3, and T4 together with a few of the plurality of receivers and the repeaters R1 and R2.
Figure 10:
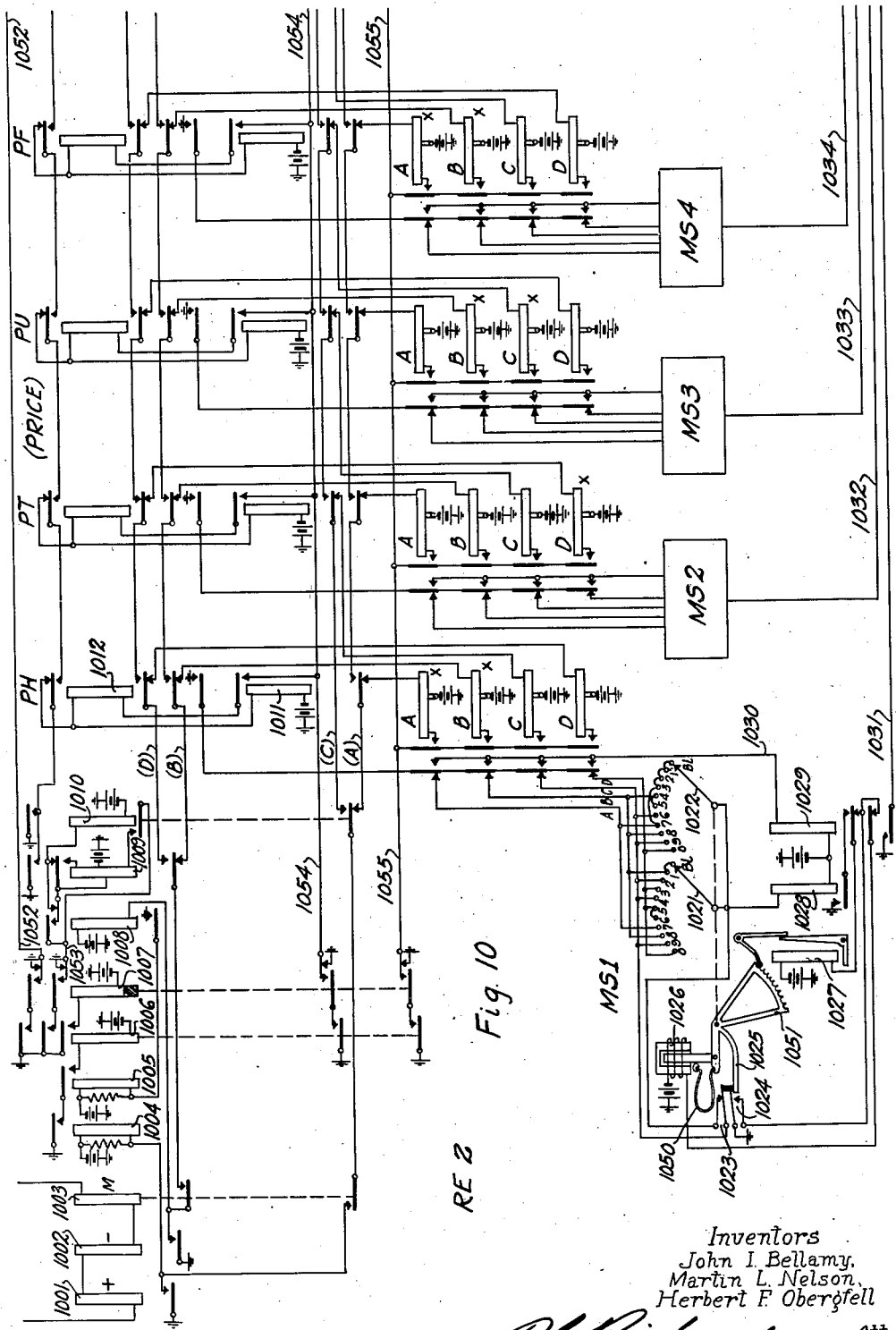
Figs. 10, 11, and 12 show circuit drawings of one of the receivers which may be designated as the receiver RE2.
Figure 11:
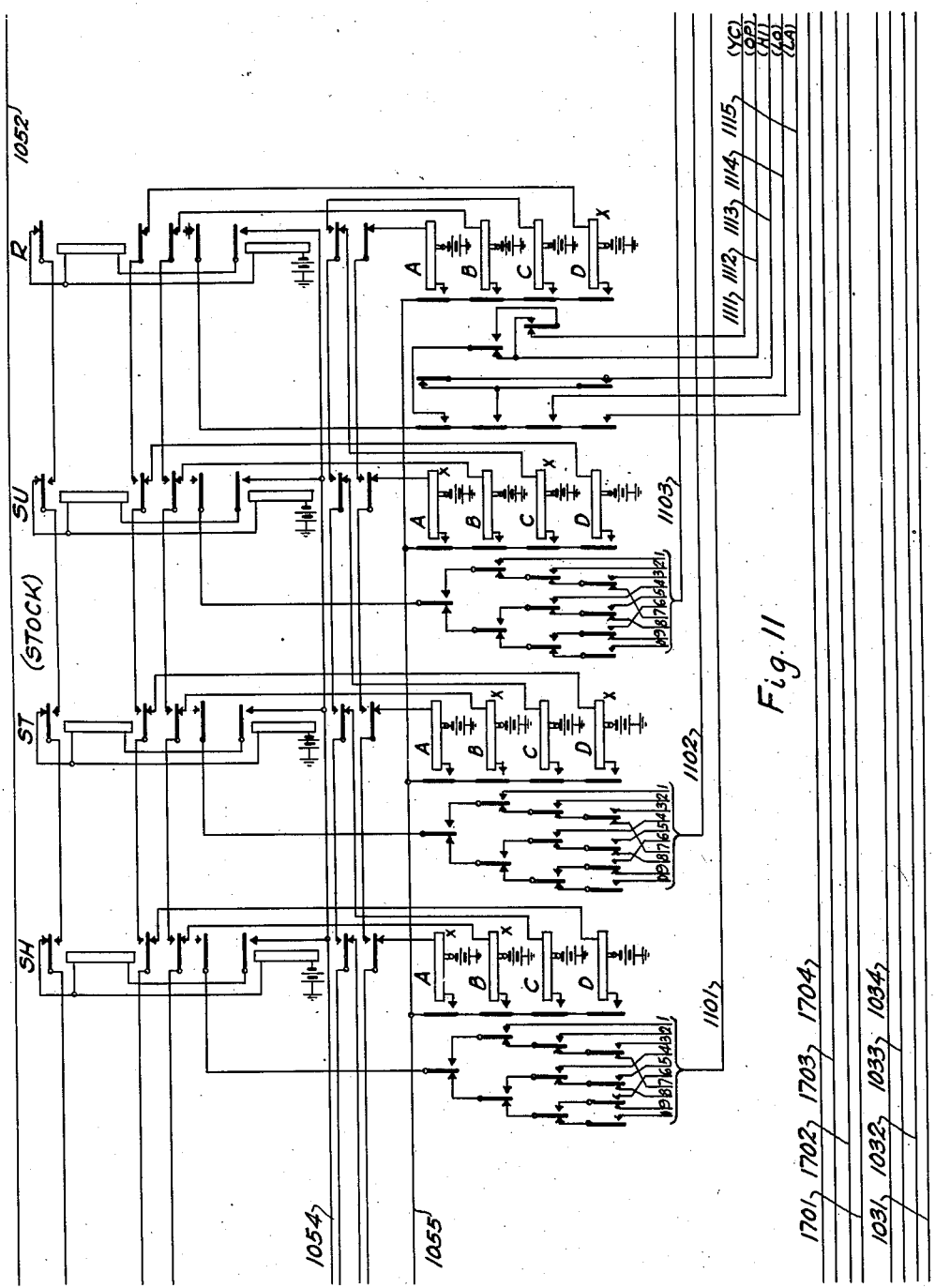
Figure 12:
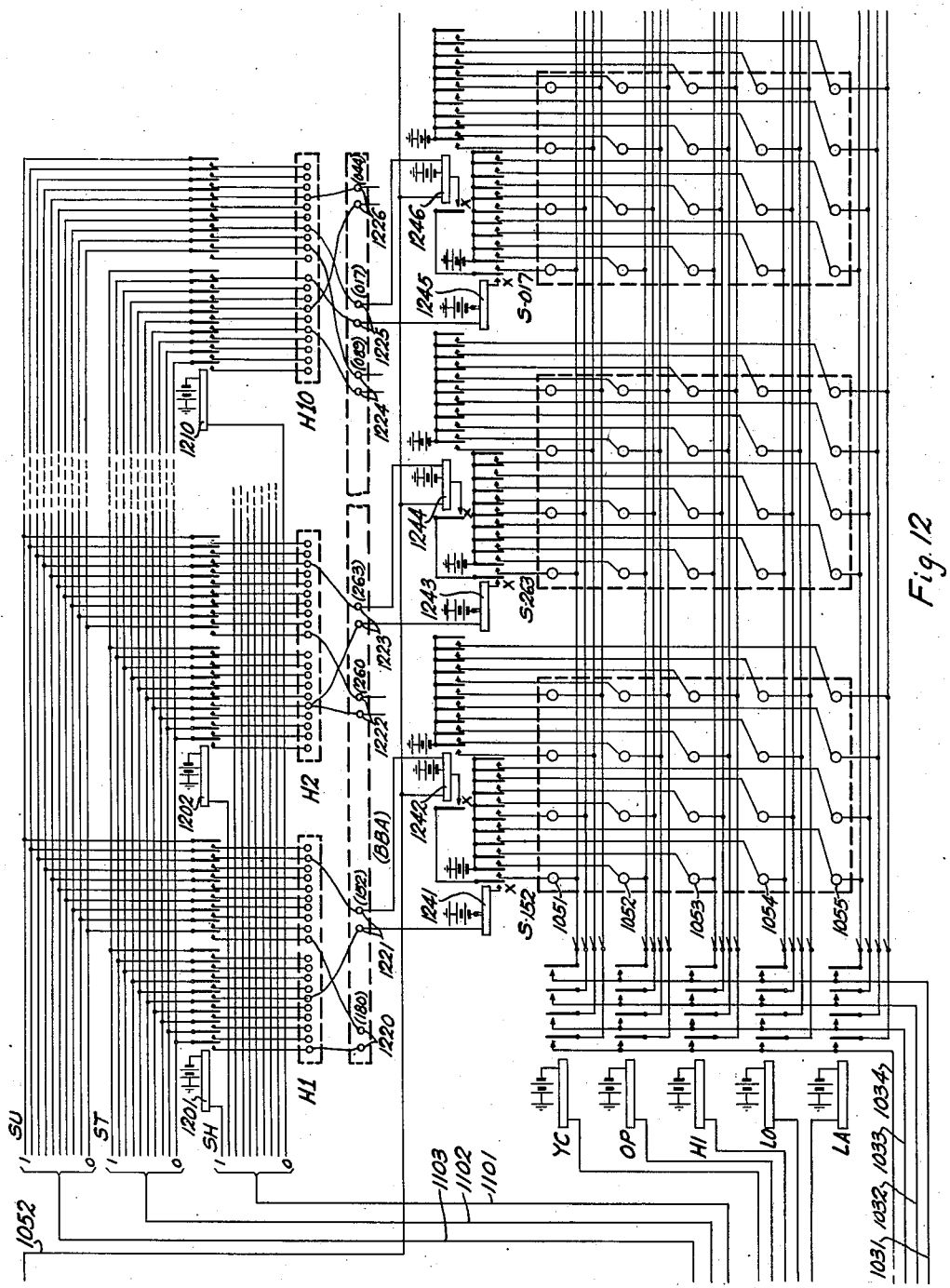

Referring now particularly to Figs. 9 to 12, the operation of the repeating apparatus in Fig. 9 and the receiving apparatus in Figs. 10 to 12 will be explained. Since, as will be recalled, the transmitting apparatus is in two parts, each of the two operators having her own transmitter, the receiving apparatus is provided in two parts, a separate section of the receiver being arranged to receive stock quotations as transmitted by each of the operators. The transmitting apparatus used by the first operator, and shown in Figs. 1 to 8, is used, as before mentioned, to handle quotations of stocks A to K and of stock designated by more than one letter of which the first letter is any from A to K.

In Fig. 9 there is shown a transmitter T2 which may be substituted for the transmitter T1 by the operation of the key 901. This spare transmitter is provided so that in case something goes wrong with the one in use, the operator may immediately operate the key 901 and proceed with the spare transmitter.

The transmitter T3 is the one used by the second operator and is the same as the transmitter T1 except that the stock register in the transmitter T3 corresponding to the stock register SR1, Fig. 2, is arranged to take care of the letters J to Z instead of the letters A to R, the letters J to R being common first letters to both operators to that sufficient flexibility is secured in shifting the line of stock division from one operator to another from time to time as changes may occur in the relative activity of the stocks.

The repeater R1 is arranged to respond to either of the transmitters T1 or T2, depending upon the position of the key 901 and the repeater R2 is arranged to respond to either the transmitter T3 or T4 of the second operator, depending upon the position of the associated transfer key. The repeater R1 comprises a sensitive negatively polarized relay 902, a sensitive non-polarized relay 903, and a non-polarized marginal relay 904 connected in series. These relays are arranged to receive quite a substantial current over conductor 827 so that they have sufficient power to operate several contact springs to control as many separate circuits as may be necessary. It is assumed that there are several brokers' offices close to the transmitting stations and the receivers in these are connected to operate over conductors extending directly from the repeaters R1 and R2. The receiving pairs are connected in series in sets of about ten or fifteen to a circuit. For example, connected from one of the circuits leading from the repeater R2 there are the repeaters RE1, RE3, and RE5 connected in series. It is assumed that there are a number of receivers connected in circuit between the receivers RE3 and RE5. In the same way, one of the circuits extending from the repeater R1 extends through the receivers RE2 shown in Figs. 10 to 12 and RE4, intervening receivers, and through the receiver RE6 to ground, the receivers RE2, RE4, and RE6 being paired, respectively, with receivers RE1, RE3, and RE5. There are other pairs of circuits extending out of the repeaters R1 and R2 as shown, and one of the pairs leads to the repeaters R3 and R4 located some distance away from the transmitting point and near a second group of receivers. These repeaters may be identical with the repeaters R1 and R2 and as many circuits as desired may be taken out of the repeaters R3 and R4.

The operation of the repeater R1 will now be explained. When a light impulse, whatever its polarity, is received over conductor 827, the sensitive relay 903 operates and extends a potential to all of the circuits connected to the repeater, this potential passing through the resistances associated with the contacts of relay 904, causing the impulse to be repeated as a light impulse. The marginal relay 904 does not respond to light impulses. In case the light impulse is positive in polarity, relay 902 does not operate and leaves the repeating circuits in connection with the positive current source, but relay 902 responds to all negative impulses whether they are light or heavy and switches the repeating circuits away from the positive source into connection with the negative source of potential, causing all negative impulses to be repeated as negative impulses. Each impulse that is heavy, that is, one that does not come through either of the resistances 801 and 802, Fig. 8, is repeated directly and not through the resistances associated with the contacts of relay 904 on account of the fact that marginal relay 904 responds to all heavy impulses. In this way, the received impulses are repeated as light and heavy according to their strength and as positive or negative according to their polarity.

In the receiver RE2 of Figs. 10 to 12, the receiving relays 1001-1003 of Fig. 10 respond to the impulses. Relay 1001 responds to all positive impulses whether they are light or heavy on account of the fact that it is so polarized, and relay 1002 responds to all negative impulses both light and heavy, being negatively polarized. Relay 1003 responds to all heavy impulses, whether they are positive or negative, but, being marginally adjusted, it does not respond to light impulses.

To continue with the description of the reception of the quotation transmitted, as hereinbefore described, it will be recalled that the first digit transmitted is the price-hundreds digit 1, being represented, according to the table in Fig. 20, by a heavy positive, a heavy negative, a light positive, and a light negative. When the heavy positive impulse, the first impulse of the first digit, is received, relays 1001 and 1003, Fig. 10, operate. Relay 1001 operates because of the polarity of the impulse and relay 1003 operates because of the strength of the impulse. A circuit is closed through the contacts of relay 1001 and the lower contacts of relay 1003 for the A relay of the price-hundreds register PH by way of contacts of relays 1010 and 1011. A circuit is also prepared at the inner contacts of relay 1003 for relay B, but this circuit is not completed at this time owing to the fact that relay 1002 is not energized. When relay A operates, it locks itself at its inner contacts to ground by way of the grounded locking conductor 1055, grounded through the normally closed contacts controlled by the lower armature of relay 1007.

When the second impulse of the digit, a heavy negative impulse, is received, relay 1003 falls back and reoperates, as does any ordinary relay, when the polarity of the current flow through it is reversed, and relay 1002 operates. Relay 1001, having restored at the end of the positive impulse, remains non-operated. With relays 1002 and 1003 operated, a circuit is closed through the contacts of relay 1002 and the inner contacts of relay 1003 for relay B of the price-hundreds register PH, by way of contacts of relays 1009 and 1012. When relay B operates, it locks itself at its inner contacts to ground by way of the grounded locking conductor 1055.

As a further result of the operation of relay 1002, it closes a circuit for relay 1008, relay 1008 being arranged to respond to each operation of the negative impulse 1002 whether the marginal relay 1003 is operated or not. When relay 1008 operates, it closes a circuit for relay 1010 at its upper armature from ground on the grounded locking conductor 1053 and by way of the upper armature, normal, of relay 1009. Relays 1009 and 1010 will be recognized as similar to the relays 807 and 808 in the transmitter. When relay 1010 operates, it closes a locking circuit for itself in series with the lower winding of relay 1009 so that when the initial circuit of relay 1010 is opened upon the falling back of relay 1002 at the end of the first negative impulse, relay 1009 operates and connects its upper winding in parallel with the winding of relay 1010.

When relay 1010 operates, it closes a circuit for the transfer relay 1011 through contacts of relay 1012, and relay 1011 operates and locks itself energized through relay 1012, which latter relay does not operate for the time being owing to the fact that it is short circuited. Relay 1010 transfers the impulsing conductor associated with the positive relay 1001 from conductor A to conductor C, and relay 1011 transfers the A conductor from the A relay of the price-hundreds register PH to the corresponding relay of the price-tens register PT. When relay 1009 operates, it transfers the impulse conductor associated with the contacts of the negative relay 1002 from the B conductor to the D conductor.

When relay 1008 energizes again, at the beginning of the second negative impulse, it opens the circuit of relay 1010 at the normally closed contacts controlled by its upper armature, relay 1009 being operated at this time, and closes a direct circuit for the upper winding of relay 1009 through the inner upper armature, operated, of relay 1009. Relay 1010 falls back and opens the previously established locking circuit for the two relays in series so that when relay 1008 falls back at the cessation of the second negative impulse and opens the circuit of the upper winding of relay 1009, relay 1009 falls back also, and both relays are again in normal position at the end of the second negative impulse, which is the last impulse of the first digit. When relay 1009 falls back, the short circuit is removed from around the winding of relay 1012 at the upper contacts of relay 1009 and relay 1012 energizes in series with relay 1011 and transfers the D and B conductors to the relays of the price-tens register PT.

As the impulses of the succeeding digits come in, the relays 1001-1003 and 1008-1010 operate in the manner hereinbefore described, and the transfer relays associated with the succeeding registers operate to transfer the conductors A, B, C, and D along as the impulses are received. As a result, the price-tens digit 0 is stored by an energization of the register relay D in the price-tens register PT; the price-units digit 4 is stored by the energization of the relays B and C of the register PU; the price-fractions digit 1 is stored by the energization of the relays A and B of the register PF; the stock-hundreds code digit 8 is registered on the stock-hundreds register SH, Fig. 11, by the energization of relays A and B; the stock-tens digit 5 is registered by the energization of relays B and D of the register ST; the stock-units digit 2 is registered by the operation of the relays A and C of the register SU; and the range indication LA (last price) is registered by the energization of relay D of the range register R, the transfer relays of the several registers in the receiver operate in the same manner as described in connection with relays 1011 and 1012.

It will be noted that a circuit is closed for the shunted relay 1004, each time the positive relay 1001 operates during the receipt of a price quotation. This relay operates the first time its circuit is closed, and, due to the shunt around it, remains operated between positive impulses by circulating current so that the relay, once energized, remains operated throughout the entire series of impulses.

It will be noted further that the relay 1005 is operated at the lower contacts of relay 1008 when the latter relay operates in response to the first negative impulse. Being slow acting due to the shunt around its winding, relay 1005, when once operated, remains operated throughout the series of impulses.

With relays 1004 and 1005 operated, a circuit is closed for relay 1006. At its middle-upper and upper armatures and at its two lower armatures, relay 1006 prepares alternate paths to ground for conductors 1052, 1053, 1054, and 1055, while at its inner upper armature it closes a circuit for slow-acting relay 1007. When relay 1007 operates it shifts the conductors 1052-1055 to the alternate paths to ground through the contacts of relay 1006 so as to permit the said conductors 1052-1055 to become momentarily ungrounded, as will be hereinafter pointed out, when relay 1006 falls back.

Setting the master switches

In order to set the master switch MS1, shown in the circuit diagram of Fig. 10 and mechanically in Fig. 13 (which master switch is substantially identical with the master switch disclosed in the patent to Keith, No. 1,185,510, granted May 30, 1916, relays A and B of the price-hundreds register PH prepare the associated setting circuits. These circuits become effective when relay 1012 operates at the end of the second negative impulse (the last impulse) in the price-hundreds digit 1. When relay 1012 operates, it closes at its lower armature a circuit through the left-hand armatures of the operated relays A and B of the register PH for the holding relay 1029 over conductor 1030. At the same time, a circuit is closed through the left-hand armature and resting contact of the C relay and through the off-normal contacts 1023 (held closed by the finger 1025) for the start relay 1028. Due to the fact that relays A and B are both operated, there are no circuits closed for relay 1028 by way of the wipers 1021 and 1022. When relays 1028 and 1029 both operate, a circuit is closed through contacts of both relays in series for the locking magnet 1027. Magnet 1027 operates and moves the associated locking arm out of engagement with the locking segment 1051. When this occurs, the master switch is propelled in a counter-clockwise direction by the U spring 1050. The off-normal contacts 1023 open and the off-normal contacts 1024 close when the master switch has moved one step from its blank position to its #1 position. In the #1 position, the wipers 1021 and 1022 are standing on their #1 contacts, but no circuit is complete for relay 1028 owing to the fact that the A and B relays of the register PH are both operated. As a result, relay 1028 falls back responsive to the opening of off-normal contacts 1023 and opens the circuit of the locking magnet 1027, whereupon the locking magnet 1027 deenergizes and permits the locking arm to engage the next notch in the locking segment 1051, holding the master switch in its #1 position corresponding to the digit 1.

In a similar way, the master switch MS2 is positioned under the control of the associated relays A to D of the register PT. Relay D is the only one of this group energized and as a result a circuit remains closed for the start relay (corresponding to relay 1028 of the master switch MS1) until the master switch reaches its tenth position. It will be noted upon inspection of the master switch MS1 that a circuit remains closed over one or both of the wipers 1021 and 1022 in all positions except the tenth when only the D relay is energized after ground potential has been supplied to the left-hand armatures of the relays A to D.

In a similar way, the master switch MS3 is set in its fourth position, as the PU relays B and C are energized, and the master MS4 is set in its first position, as the relays A and B are energized in the price-fractions register PF. It will be appreciated, of course, that the master switch MS1 starts to move as soon as the price-hundreds digit is received, and that the succeeding master switches start to move as soon as their respective controlling digits are received. As a result, the master switch MS4, the last one to start, is setting itself while the registers SH, ST, SU, and R are being operated. Due to the relative speed of the master switches and of the sending apparatus, the master switches are all positioned by the time the range register R, Fig. 11, receives the last digit in the number.

Selecting the stock

For the purpose of identifying the stock register group on which the received price quotation is to be recorded, ten hundreds relays 1201, 1202, to 1210, Fig. 12, are provided, three of these relays being shown. From the contact pyramid of the relays A to D of the register SH there extend ten conductors, each corresponding to a different hundreds, only one of these conductors becomes grounded in the given case. In this case, since it is the A and B relays that are operated, the ground potential is extended upon the operation of the upper transfer relay of the stock-hundreds register SH to the #1 hundreds conductor, operating the first hundreds relay 1201. This relay connects the stock-tens and stock-units groups ST and SU, Fig. 12, through to the upper portion of the cross-connecting rack shown in Fig. 12.

In order to make a selection as to the stock-tens, there are ten conductors extending from the contact pyramid of the relays A to D of the stock-tens register ST. This conductor group is shown in Fig. 12 and is labeled ST. Since the digit 5 has been stored on the register ST by the energization of relays B and D, the fifth conductor of the group is grounded and the ground potential is accordingly extended upon the energization of the upper transfer relay of the register ST over the fifth conductor of the group ST, and through the jumper shown in Fig. 12 to the left-hand contact of the contact set 1221 by way of contacts of the hundreds relay 1201. This energizes stock relay 1241 only slightly, owing to the fact that the left-hand winding is an inefficient winding drawing small current. As a result, only the contacts marked X are closed by the energization of the left-hand winding. In a stock quotation receiving board containing many stocks, it is possible and perhaps probable that every conductor closed through by a stock-hundreds relay such as the relay 1201 will have a plurality of jumpers connected to it, each leading to a winding of a separate stock relay, such as the stock relay 1241. When this conductor is grounded, each of the relays to which a jumper is connected pulls up through its first step and closes its X contact, but the relay does not close its remaining contacts except under a condition to be described hereinafter.

In accordance with the setting of the stock-units register SU, Fig. 11, the relays A and C thereof arrange the contact pyramid so that ground from the lower contact of the upper transfer relay of the register SU is extended through contacts of the operated relays A and C as well as through contacts of the unoperated relay B to the second conductor in group SU, Fig. 12. When this conductor is grounded, a connection extends through contacts of the stock-hundreds relay 1201 and a jumper on the cross-connecting block to the right-hand terminal of the set 1221 and from thence to the right-hand winding of the stock register relay 1242. Relay 1242, due to the design of the right-hand winding is able to operate only far enough to close contacts marked X when energized through the right-hand winding alone. As a result, if relay 1242 is energized at a time when relay 1241 is not energized the relay operates only its X contact and does not close the connections through with its contacts on the right-hand side of the relay. At this time, however, both relay 1241 and relay 1242 are operated and a circuit exists from the grounded conductor 1052 through the two relays and their X contacts in series. The left-hand winding of relay 1242 and the right-hand winding of relay 1241 are efficient windings drawing sufficient current to operate the relays fully. Accordingly, relays 1241 and 1242 are both completely operated, and a battery potential is extended to each of the holding magnets of the stock group 152. Of the twenty magnets in this group, a reference (1051-1055) has been applied to the hundreds magnet of each horizontally-disposed group of four. These twenty magnets are the release magnets of registers, such as the register R1 shown in Figs. 14, 15, and 16. The construction of the magnet 1051 can be seen in Fig. 15. The construction of each of the other magnets is similar.

*Operation of range relays—setting the indicators*

As a result of the operation of the range register R, wherein the transfer relays (the vertical pair) are operated and the register relay D is operated, a ground potential is extended over the last-price conductor LA 1115 to the last-price range relay LA of Fig. 12. Relay LA operates and extends a connection from conductors 1031, 1032, 1033, and 1034 to the respective magnets of the bottom row (the last-price registers) in each stock group. Since only the magnets of the stock group S152 have a battery potential extended to the upper terminals, the registers of last price row (the lower row) of the stock group S152 only are operated. The operation of these magnets results in the associated indicators being set in a manner to be described hereinafter. It will suffice at this point to state that the master switches have set inner-linked shafting by their movements as explained hereinbefore and that the releasing operation of the lower row of magnets of the stock group S152, Fig. 12, results in the associated indicators taking up the setting predetermined by the set position of the master switches, while the other indicators are not moved.

The operation of the stock relays 1241 and 1242, it will be understood, takes place as soon as the stock units digits have been received on the stock units register SU; the operation of the range relay LA, Fig. 12 takes place as soon as the last digit has been received on the range relays and the upper transfer relay of the range register R has operated; and as hereinbefore explained, the master switches MS1-MS4 have finished setting themselves by the time the range register R receives the last digit. Consequently, upon the operation of the range relay LA, the magnets operate as hereinbefore described just at the end of the impulses comprising the complete stock quotation number.

*Clearing out the receiver*

Shortly after the end of the impulses, relays 1004 and 1005 fall back because they receive no further impulses. As a result, relay 1006 falls back and removes ground from conductors 1052, 1053, 1054 and 1055. Relay 1006 also opens the circuit of the slow-acting relay 1007, but this relay does not fall back for a slight interval. When the ground potential is removed from conductor 1052, the stock relays 1241 and 1242 fall back; when the ground potential is removed from conductor 1053 the relays 1009 and 1010 fall back (if one or both of them happen to be energized at any time when conductor 1053 is ungrounded); when conductor 1054 is ungrounded, all of the transfer relays of the registers PH, PT, PU, PF, SH, ST, SU, and R fall back; and responsive to the removal of the ground potential from conductor 1055 all of the register relays A to D of the above-mentioned registers are unlocked and fall back.

*Restoring the master switches*

Since the registers have been restored to normal, the range relay LA, Fig. 12, falls back and the holding relays of the master switches MS1-MS4 including the holding relay 1029 of the master switch MS1 fall back and these master switches restore to the normal position shown. When relay 1029 falls back it removes ground from conductor 1031 at its lower armature and at its inner armature it closes a circuit through the off-normal contacts 1024 for the locking magnet 1027, energizing the locking magnet to permit the master switch to restore. At the same time, a ground potential is closed through off-normal contacts 1024 and the middle armature of relay 1029 for the solenoid 1026, which energizes and attracts the associated plunger to pull the master switch into the position shown in the drawings. When the normal position is reached, off-normal contacts 1024 operate and open the circuit of the solenoid 1026 and the circuit of the locking magnet 1027. Magnet 1027 thereupon deenergizes and holds the master switch in the normal position as shown.

The apparatus in the receiving station is now in its normal position and is in readiness to receive a further stock quotation.

It is to be understood that very few, if any, brokers will subscribe to quotations of all stocks handled by the central transmitter, most brokers taking not more than two hundred out of nearly a thousand stocks which may be quoted at the transmitting station. Accordingly, many quotations coming into a receiving station do not result in any changes on the indicators (Fig. 12)

in the receiving station on account of the fact that no indicator set corresponds to the instant stock indication.

*Mechanical arrangement of the indicator system*

Referring now particularly to Figs. 13–16, the mechanical arrangement of the indicators will be explained. It may be stated at the outset that each indicator is essentially a drum with numerals thereon, together with means for rotating the drum to a desired position so that the desired numeral shows through a door provided for the purpose. This drum may be seen in Figs. 14, 15, and 16, showing the register R1 wherein the drum is indicated by the reference character 1607.

In Fig. 13 two of the four master switches MS1–MS4, shown in Fig. 10 are indicated mechanically. In Fig. 13, 1027 indicates the locking magnet as in Fig. 10; 1051 indicates the locking segment; 1025 indicates the off-normal spring operating arm; 1024 indicates the contact set 1024 shown in Fig. 10 (the contact set 1023 being mounted directly behind the contact set 1024 and, therefore, out of sight); 1050 indicates the driving U spring; and 1026 indicates the solenoid which restores the master switch to normal, winding up the U spring.

As stated hereinbefore, the stock registers are mounted in groups of twenty. Each horizontally-disposed group of four registers indicates a price pertaining to the stock, the prices indicated being yesterday's closing price and today's open, high, low, and last prices. These five sets of four registers each form a group of twenty that are mounted in a rectangular formation as may best be seen upon reference to Fig. 18. Naturally, of course, the registers are mounted closer together than in Fig. 18, there being little, if any, space left between the registers representing a single stock.

For the purpose of actuating the registers, the shaft 1301, Fig. 13, mounted in bearings in the bearing plates 1351 and 1352 and supported by the upper bearing, is connected to the master switch by the master switch shaft 1350, the two shafts being related to one another in a bell-crank arrangement as may be seen in Fig. 15. It will thus be seen that the shaft 1301 does not simply rotate on centrally located bearings but swings in an arc. This shaft 1301 is arranged to swing directly behind all of the hundreds registers of all of the stocks arranged in a vertical row from the bottom of the board to the top of the board. The shaft 1305 is connected by means of the link 1309 with the shaft 1301 so that the shaft 1305, also disposed behind a vertical row of hundreds registers, follows the motion of the master switch MS1 as imparted through the link 1309. A similar link extends to a shaft (not shown) to the left of the shaft 1391 and one extends to a shaft (not shown) to the right of the shaft 1305, every fourth shaft across the board being linked together into a single mechanical system.

In a similar way, the shaft 1306 is controlled by the master switch MS2, as are other shafts, including shaft 1302 inter-linked with the shaft 1306 by the link 1310. The master switch MS2 is set in accordance with the price tens digit as may be noted upon reference to Fig. 10.

The master switch MS3 is not shown but is connected to the mechanical system including the tens shafts 1303 and 1307; while the master switch MS4 is connected to the mechanically inter-linked system including the shafts 1304 and 1308 and the inter-connecting links such as 1312.

From the foregoing it will be seen that a vertical shaft is provided for controlling each vertical row of registers and that these shafts are cross-linked into four groups, one for the price hundreds, one for the price tens, one for the price units, and one for the price fractions; these four groups being controlled by the master switches MS1, MS2, MS3, and MS4, repectively.

The arrangement of the master switches and shafting together with the general disposition of the registers having been explained, the details of the construction of the register R1, the outlines of which are indicated in Fig. 13 will be explained in connection with Figs. 14, 15, and 16. As hereinbefore mentioned, the register is essentially a drum 1607 having the digits 1 to 0 and a blank space on the surface together with means for rotating it to a desired position. The frame work of the register includes two plates 1605 and 1606, both of which may be seen edgewise in Fig. 15, (the top plate 1605 being removed in Fig. 16 to give a view of the mechanism from the top) and the four connecting posts 1601–1604 best seen in cross-section in Fig. 16. The drum 1607 is mounted at the front end of the register in bearings in the two plates 1605 and 1606, and the numbers on the drum appear through the window in the front covering as may be seen in Fig. 14. It will be noted that the tip of the armature 1021 of locking magnet 1051 is normally in a hollow between two of the eleven teeth provided on the lower portion of the drum 1607, and, accordingly, holds the drum in a locked position. It will be noted that the display drum is provided at its upper portion with a gear wheel 1608 with which the gear wheel 1609 is in mesh, and that the segment 1610 pivoted on an extended center line of the shaft 1350 of the master switch MS1 is provided with a geared piece for rotating the hub of the gear wheel 1609. Accordingly, a movement one way or another of the segment 1610 results in a rotation of the drum, such movement being ordinarily prevented by the locked condition of the drum 1607 by the tip of the armature 1021. It will be noted further that the two members 1611 and 1613, also pivoted on the same shaft with the segment 1610, normally tend to come together through the influence of the spring 1623.

With the drum locked in any given position and with the master switch standing in its normal position shown in the drawings, the arm 1611 is displaced and rotated by the shaft 1301 to the position shown in the drawings. The member 1613 is held, and prevented from following, by the tail of the segment 1610, such tail being provided with a raw-hide or similar contact piece against which the turned up portion of the member 1613 is pressed by the action of the spring 1623.

If the magnet 1051 is energized to withdraw the tip of the armature 1021 from the drum 1607, with the master switch in its normal position, the spring 1623 draws the ends of the members 1611 and 1613 together, and the member 1613 drives the contact piece 1614, secured in the tail of the segment 1610 until it engages the upturned portion of the member 1611. The movement of the segment 1610 imparts a motion through the hub of the gear wheel 1609, which is imparted to the drum 1607 and causes the drum to turn until the blank space thereon shows through the window. In a similar way, if the shaft 1301 is set in any other position, the action of the spring 1623 swings one or the other of the members 1611 and 1613 so that they contact with the flange of the shaft through their contact pieces 1615 and 1616 and they both contact with the tail of the segment 1610 through the contact piece 1614, always bringing the drum into position to display the number corresponding to the setting of the master switch in case the magnet 1051 is energized to release the drum. It will thus be seen that when the master switch is set the registers all show the original display and only those released by the energization of their respective release magnets, subsequent to the movement of the master switch, change position and take up a new setting. The impulse imparted to a release magnet is only momentary but it is of sufficient duration to permit the drum to arrive at its new position.

After the drum 1607 has become set in its new position, the magnet 1051 deenergizes, and at the tip of the armature 1021 again locks the drum. The notches in the locking portion of the drum are cut V-shaped so that the tip of the armature 1021 has a centering action when it enters the notch.

From the description hereinbefore given in the manner in which the desired indicators of the stock group S—152 (corresponding to the stock BBA) are set, it will be understood that the indicators of the stock S—263 are set only in case the storage relays A to D of the stock hundreds register SH, Fig. 11, cause a ground potential to be extended to relay 1202 to connect up the associated group of twenty conductors corresponding to the second hundreds, and then only in case the tens conductor 6 is grounded and by the register ST and the units conductor 3 is grounded by the units register SU. In the same way, the stock group S—017 is rendered effective only when the hundreds digit is 0 so as to operate the relay 1210 and in case the tens and units digits are one and seven, respectively. This is true, of course, because no one of the stock relays such as 1241 to 1246 can operate fully unless the associated relay, with which it is paired, is also operated to close the powerful energizing circuit necessary through the main windings of the two relays in series to operate them all the way.

It may be well to mention at this point that in case a new price relative to a stock does not contain a hundreds digit as set up in the transmitter, the hundreds digit transmitted consists of light impulses only and none of the storage relays A to D of the hundreds register PH, Fig. 10, is operated. In this case there is no ground potential on conductor 1031 and relay 1029 fails to operate. Accordingly, there is no ground potential on conductor 1031 and as a result no one of the release magnets associated with the hundred register in any stock group can operate. A similar condition exists if the tens digit is omitted and also if the units digit is omitted.

In some cases a new stock quotation differs from the old one only in that the new stock quotation ends with a different fraction. In this case it is merely necessary to move the fractions register. In other cases the new quotation may mean a change in only the units and fractions registers, while in still other cases the quotation is the change in only the tens, units, and fractions.

Setting up short numbers

In the transmitter, variations in the number of digits in a transmitted price is automatically taken care of in a manner now to be explained.

In case only a single price digit is set up by the operation of only one of the digit keys of Fig. 5 this is registered on the price hundreds register PH, Fig. 7. In case the operator next operates a range key and causes the operation of one of the relays A to D of the range register R, Fig. 6, a circuit is closed over conductor 609 at the lower contacts of transfer relay 610 when it operates through the lower armature normal of relay 607, lower armature normal of relay 705, and the inner lower armature normal of relay 703, for connecting relay 707. In this case, relay 707 connects the conductors extending from the upper contacts of the relays A to D of the register PH to the conductor group PF extending to the sending apparatus in Fig. 8. Accordingly, the digit registered on the register PH is transmitted as a fraction, digits and the hundreds, tens, and units digits are transmitted with light impulses only and none of the register relays in the receiver in the hundreds, tens, and units registers are operated, as hereinbefore mentioned.

Assuming that the operator sets up only two digits, a units digit and a fractions digit. The units digit is recorded on the register PH, Fig. 7, and the fractions digit is recorded on the register PT. Under this condition, when the range register R is operated and ground is placed on conductor 609, a circuit is closed through the lower contacts of relay 707 and relay 705 and through the lower armature, operated, of relay 703 for the connecting relay 708. Relay 708 at its upper set of four contact pairs connects the conductors of the register PH to the conductor group PU extending to the sending apparatus of Fig. 8, and at its inner set of four contact pairs connects the conductors of the register PT to the conductor group PF, extending to the sending apparatus of Fig. 8. As a result the two digits set up on the registers PH and PT are sent out as the units and fractions digit.

It will be seen that in case tens, units, and fractions digits are recorded on the registers PH, PT, and PU a circuit is closed upon the operation of the range register over conductor 609 and through the lower armature, normal, of relay 707 and the lower armature, operated, of relay 705 for the connecting relay 709. Relay 709 connects the conductors of the register PH to the price tens group PT, extending to the sending apparatus; it connects the conductors of the register PT to the group PU, and it connects the conductors of the register PU to the conductors PF, causing the digits to be sent out as the tens, units, and fractions digits. It has already been explained how when four digits are set up on the registers PH, PT, PU and PF relay 707 is operated when conductor 609 becomes grounded and the relays 710 and 711 operate to connect the conductors of the four registers straight through to the sending apparatus and send out the four registered digits as the hundreds, tens, units, and fractions digits, respectively.

Setting up yesterday's closing price

At the close of the day, when the last stock quotations come through for a particular stock and is set up and sent through as the last price, this last price is subsequently resent, before the operator leaves the premises, as yesterday's closing price so that it will show on the indicators when business is resumed the next day. To do this, the operator sets up a stock indication in the manner hereinbefore described, followed by the last price as indicated by the last-price registers of that stock (it being usual to provide a receiving board at the transmitting station operated from one of the receiving circuits extending from the repeaters of Fig. 9 so that the operators may check up on what they are sending). Having set up the stock and price indication, the operator depresses the range key YC, Fig. 5, operating relays A and B of the register R, Fig. 6. The sending apparatus operates in the manner hereinbefore described and in the receiver of Figs. 10 and 12 the A and B relays in the range register R are operated, closing a circuit over conductor 1111 for the yesterday's-close range relay YC, Fig. 12. This causes the price to be set up on the upper row of registers in the stock selected.

Following this, the operator again registers the same stock designation and operates the blank digit key BL of Fig. 5 four times, setting up a blank hundreds digit, a blank tens digit, a blank units digit, and a blank fractions digit. Following this, the operator manipulates the key labeled OP—HI—LO—LA, this key corresponding to the indications Open, High, Low, and Last. When this occurs, relays A to D of the range register R are operated and when the sending apparatus functions the relays A to D of the range register R in the receiver, Figs. 10 to 12, are operated, and each of the range relays OP, HI, LO, and LA are operated. In addition, the master switches MS1, MS2, MS3, and MS4 remain in their blank position, the normal position, on account of the fact that relays A, B, C, and D of each of the registers PH, PT, PU, and PF are operated. Then, with the Open, High, Low, and Last range relays operated, the corresponding magnets are released and the registers with the exception of the ones having to do with yesterday's close in the stock set up, are returned to their blank positions.

First quotation of day

The sending of the first price in the morning is accomplished in the same way as the wiping out of the open, high, low, and last registers above described except that the hundreds, tens, units, and fractions of the first price of the morning are set up instead of the blanks above described.

When a different price is received, on the next sale of the stock, this price will either be higher or lower than the open price, with the result that the operator uses either the high-last key HI—LA of Fig. 5, or the low-last key LO—LA of Fig. 5.

From the foregoing description, it is thought that it can be understood how the operator takes care of the various price quotations.

Handling preferred stock

In addition to the so-called common stock, there is often a so-called first-preferred stock on the market of the same designation and sometimes also a second-preferred stock. For example, the stock BBA is a common stock and in addition there may be a stock BBA, first-preferred, and a stock BBA, second-preferred. In setting up a stock indication BBA, first-preferred, the operator sets up the BBA designation and operates the first-preferred key 1—PF. When the first-preferred key 1—PF, Fig. 1, is operated, with the relays 615 and 614 in the condition shown in the drawings, a circuit is closed over conductor 103 for relay 210. Relay 210 locks itself to conductor 250, along with the other register relays of Fig. 2 and at its upper armature closes a circuit over conductor 212 and through contacts of the energized relay 404, Fig. 4, for the first-preferred relay 401. Relay 401 operates and locks itself to conductor 606 at its upper armature and at its lower armature shifts the conductors 1 to 5 of the group CD2 from in connection with the relays 1 to 5 of the stock-tens register ST into connection with the relays 6–0, respectively. Since the tens digit ordinarily transmitted for stock BBA is digit 5, this digit is now transmitted as the digit 0, selecting a different stock group in the receiver.

If, instead, the second-preferred key 2—PF is operated, relay 209 operates instead of relay 210 and, upon operating and closing a locking circuit for itself at its lower armature, it closes a circuit over conductor 211 and through contacts of relay 405 for the second-preferred relay 402. In this case relay 401 is not operated and the tens digit is sent out as a tens digit 5, but relay 402 makes a similar change as regards the conductor set CD3, with the result that the units digit instead of being the units digit 2 is sent out as the units digit 7.

Operation of modified receiver.

Figure 18:
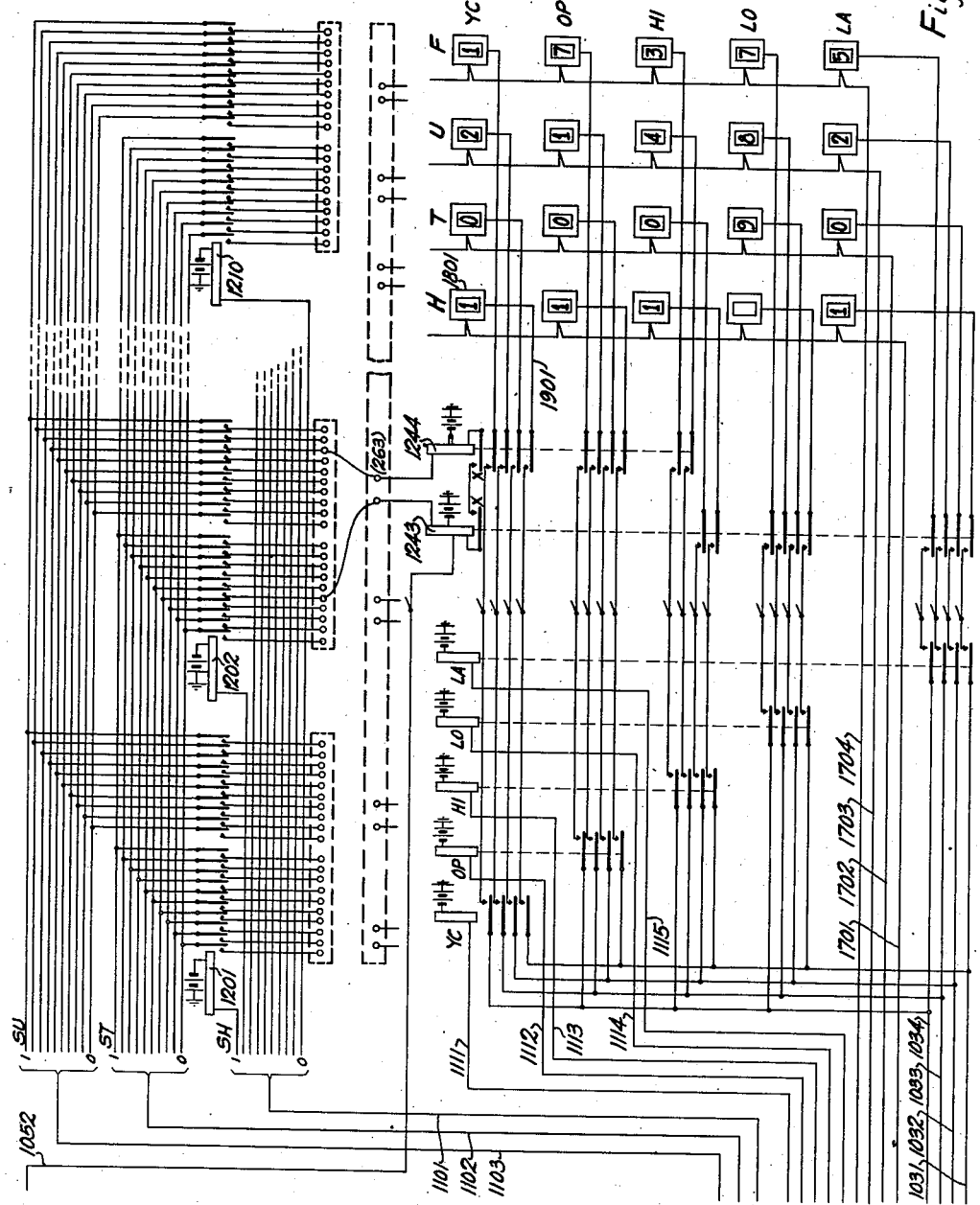

Referring now to the layout with the Figs. 17 and 18 substituted for the Figs. 10 and 12, respectively, the modified receiver employing the modified register shown in Fig. 19 will be described. The register of Fig. 19 is a step-by-step register instead of the shaft-driven register of Figs. 14 to 16. When registers of this type are used, the master switches are done away with and the indicating registers themselves operate with a hunting motion to come into the position indicated by the control registers PH, PT, PU, and PF of Fig. 17.

The register of Fig. 19 looks the same from the front as the one shown in Fig. 14. The drum 1907 is provided with ten numerals 1 to 0, and also a blank space, in the same way as the drum 1607. Above the drum 1907 there is a ratchet wheel 1909. This ratchet wheel is driven around, to operate the drum, by the double pawl carried on the end of the armature 1905 of magnet 1904. The restoring spring 1906 holds the armature 1905 in the position shown. When the magnet is energized, the right-hand pawl engages the ratchet wheel 1909, advancing the ratchet wheel and drum a half step. When the magnet deenergizes, the left-hand pawl engages the next notch in the ratchet wheel and advances the ratchet wheel and drum another half step in a counterclockwise direction, so that, starting from the position shown in the drawings, the numeral 2 is now displayed instead of the numeral 1.

The wiper 1910 is mounted on the same axis below the drum 1907 and secured rigid therewith so that it rotates with the drum. The wiper is normally standing between two bank contacts as shown, but advances onto the next contact when the drum is driven a half step upon the energization of magnet 1904. When the magnet deenergizes the wiper advances to a midway-position between the next two contacts. In order to set the register to a desired position, for example position 0, the conductor 0 extending to the "0" contact in the bank of wiper 1910 is grounded, and a ground potential is placed on the start conductor 1901. This closes a circuit through the self-interrupting contacts 1903 for the magnet 1904, causing it to energize and deenergize, advancing the drum by means of the ratchet wheel 1909. The wiper 1910 is moved around without effect until it engages the tenth bank contact connected with conductor 0, whereupon a circuit is closed for magnet 1904 through the wiper 1910 and the bank contact upon which it is standing and over conductor 0, assumed to be grounded. The magnet 1904 is therefore held operated and the drum stands midway between the 9 and 0 positions. After an interval sufficiently long to enable the register to arrive at any position, the ground potential is removed from conductor 1901 and from conductor 0, whereupon magnet 1904 deenergizes and the drum is advanced a half step to display the digit 0.

By comparing Fig. 17 with Fig. 10 it will be noted that these two drawings are substantially the same except that the master switches have been removed from Fig. 17 and the register relays A to D of the registers PH, PT, PU, and PF are each provided with a pyramid of contacts to which eleven conductors are connected. These digit conductors correspond to the positions blank and 1 to 0 of the register shown in Fig. 19, and to the eleven conductors blank and 1 to 0 connected to the bank of wiper 1910. The register 1801 shown in Fig. 19 is shown also in Fig. 18, but the details of the connections are not shown in Fig. 18, Fig. 19 being relied upon for this purpose. Each of the other registers in the group of twenty pertaining to the stock having the code 263 is the same as the register shown in Fig. 19. It will be noted that a single line is run from a bracket at the end of the contact pyramid associated with the relays A to D of the price-hundreds register PH, Fig. 17, to all of the hundreds registers of the stock group shown in Fig. 18. This indicates that these eleven conductors are multiply connected in contact banks of all the stock groups. They are, in fact, connected in multiple to the contact banks of all the hundreds stock registers in the section of the board controlled by this receiving circuit. The line 1034 is the one drawn to indicate these eleven conductors. In the same way, the conductors extending from the contact pyramid associated with the relays A to D of the register PT connect to all the tens registers, this being indicated by the line 1032 drawn to these registers from a bracket at the end of this contact pyramid. In the same way the lines 1033 and 1034 indicate, respectively, that the eleven conductors of the registers PU and PF connect to the units and fractions registers.

When a stock quotation and price is sent through, if the next price indicates a change in position of each of the registers, hundreds, tens, units, and fractions, one or more relays is energized in each of the registers PH, PT, PU and PF. As a result, one of the eleven conductors extending from the pyramid of each register group is grounded and a ground connection is placed on each of the operating conductors 1701, 1702, 1703, and 1704. Then, assuming that the stock register relays 1243 and 1244 are operated, and that the last-price range relay LA is operated over conductor 1115, an operating ground potential is extended to each of the four registers in the lower row of the group shown over the four conductors corresponding to conductor 1901 of the register 1801, Figs. 18 and 19. These registers operate in the manner described in connection with register 1801, and set themselves to within half a step of the desired position. Then, when the ground potential is removed from the locking conductors including the locking conductor 1054, all the locked-up relays fall back and the circuits of the operating magnets of the registers are opened, whereupon these magnets deenergize and advance the registers a half a step to display the desired price.

It will be noted that the operating circuits extending over conductors 1701, 1702, 1703, and 1704 are closed only when one or more register relays are operated in a particular group. This arrangement is made for the purpose of enabling the register to remain in its last set position unless a relay in the corresponding register set is operated to cause it to move on.

What is claimed is:

In combination, a transmitter including a group of registering devices, means for actuating a variable number of such devices to set up a like number of digits thereon, a sender in said transmitter operable to transmit digit impulses corresponding to the digits registered on said registering devices, a receiver under the control of said transmitter and having a register for each of said registers in the transmitter, circuit arrangements in the receiver for causing a separate one of the registers in the receiver to be set in accordance with each of the digits represented by the transmitted digit impulses, and means controlled in accordance with the number of said registers in the transmitter which are operated for causing the transmitter to exercise an additional control over said receiver different for each number of digits set up on said registers in the transmitter.

2. In a stock-quotation system, a stock-quotation transmitter including registering apparatus and sending apparatus, means effective to operate said registering apparatus to register characters identifying a stock and for subsequently registering additional characters indicating a quotation concerning such stock, means for operating the sending apparatus of the transmitter to send digit impulses indicative of the quotation and to subsequently send additional impulses indicative of the identification of the stock to which the quotation belongs, a receiver including registering apparatus responsive to the impulses transmitted by the transmitter, groups of indicators in said receiver, means operable in accordance with the last portion of the registering apparatus in the receiver for selecting a group of indicators, means operable in accordance with the first portion of the registering apparatus in the receiver for operating the selected indicators to display the stock quotation, and overlapped means whereby the first portion of said registering device operates while the identifying impulses are being received.

3. In combination, groups of indicators for posting price digits of stock quotations, means for transmitting code impulses indicative of a desired indicator group and indicative of a price to be posted, permutation devices responsive to a portion of said code impulses to select the desired indicator group, additional permutation devices responsive to a further part of the coded impulses to register and store the digits to be posted, and means for placing the selected group of indicators under the control of a variable number of said additional permutation devices for posting a variable number of price digits on the selected indicators.

4. In a stock quotation system, a stock quotation transmitter having registering and transmitting apparatus, means effective to operate said registering apparatus to register characters identifying the stock and subsequently registering characters indicating a price thereof, means for operating the sending apparatus of the transmitter to send a code indicative of the price and to subsequently send a code indicative of the stock, a receiver indicating registering apparatus responsive to such codes, one register apparatus in the receiver first responsive to the price code and another register apparatus in the receiver subsequently responsive to the stock code, means for starting the operation of the price registering apparatus in the receiver to perform its function while the stock registering apparatus in the receiver is responding to the stock code, groups of indicators in the receiver, means responsive to the stock code registering apparatus in the receiver for selecting one of such groups of indicators, and means thereafter responsive to the operation of the price code registering apparatus in the receiver for operating the selected group of indicators.

5. In combination; a bank of stepping relays; means for operating all of said relays of said bank sequentially; a plurality of channel circuits prepared by said bank of stepping relays, one for each operation of said stepping relays; means for dividing each of said channel circuits into a plurality of branches; and means remotely controlled prior to the preparation of said channel circuits for selecting for use during any particular operation of said bank of stepping relays only a particular branch of each of said channel circuits.

6. In combination, a bank of stepping relays, means for operating all of said relays of said bank of stepping relays sequentially, a channel circuit closed by each of said relays, means for branching each of said channel circuits, and means manually governed from a remote point for selecting prior to the closure of each of said channel circuits which branch for that channel circuit shall be closed during any particular operation of said bank of stepping relays.

JOHN I. BELLAMY.
MARTIN L. NELSON.
HERBERT F. OBERGFELL.